US010694571B2

(12) United States Patent
Wu et al.

(10) Patent No.: US 10,694,571 B2
(45) Date of Patent: Jun. 23, 2020

(54) SERVICE PROCESSING METHOD AND SERVICE PROCESSING APPARATUS

(71) Applicant: HUAWEI TECHNOLOGIES CO., LTD., Shenzhen, Guangdong (CN)

(72) Inventors: Xiaobo Wu, Shanghai (CN); Weiwei Chong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 194 days.

(21) Appl. No.: 15/441,440

(22) Filed: Feb. 24, 2017

(65) Prior Publication Data

US 2017/0171904 A1    Jun. 15, 2017

Related U.S. Application Data

(63) Continuation of application No. PCT/CN2015/094597, filed on Nov. 13, 2015.

(30) Foreign Application Priority Data

Sep. 15, 2015  (WO) ................ PCT/CN2015/089664

(51) Int. Cl.
*H04W 76/18* (2018.01)
*H04W 76/00* (2018.01)
(Continued)

(52) U.S. Cl.
CPC ....... *H04W 76/18* (2018.02); *H04W 28/0231* (2013.01); *H04W 28/0236* (2013.01);
(Continued)

(58) Field of Classification Search
CPC ............... H04W 76/027; H04W 76/18; H04W 28/0231; H04W 28/0236; H04W 48/02;
(Continued)

(56) References Cited

U.S. PATENT DOCUMENTS 4,718,081 A *  1/1988  Brenig ................. H04W 36/30
                                                    455/438
7,042,858 B1 *  5/2006  Ma ....................... H04L 1/0618
                                                    370/208
(Continued)

FOREIGN PATENT DOCUMENTS

CN          101795442 A  *  8/2010
CN          102783217 A  *  11/2012
(Continued)

OTHER PUBLICATIONS

3GPP TS 24.008 V13.2.0 (Jun. 2015) titled "3rd Generation Partnership Project; Technical Specification Group Core Network and Terminals; Mobile radio interface Layer 3 specification; Core network protocols; Stage 3 (Release 13)", (Ts-324008 hereinafter) was originally published Jun. 2015. (Year: 2015).*
(Continued)

*Primary Examiner* — Andrew Lai
*Assistant Examiner* — Andrew C Lee
(74) *Attorney, Agent, or Firm* — Fish & Richardson P.C.

(57) ABSTRACT

A service processing method, a service processing apparatus, and a communications system are provided. The service processing method includes: receiving, by an access network device, from a core network device, a bearer setup request message of a VoLTE service; and rejecting, by the access network device, the bearer setup request message when determining that LTE network signal quality of a terminal of the VoLTE service cannot satisfy the VoLTE service. The technical solutions provided in embodiments of the present disclosure help improve stability of an established VoLTE service, thereby helping improve call experience of a user.

8 Claims, 8 Drawing Sheets

(51) Int. Cl.
  *H04W 28/02* (2009.01)
  *H04W 48/02* (2009.01)
  H04W 76/16 (2018.01)
  H04W 36/00 (2009.01)
(52) U.S. Cl.
  CPC ........... *H04W 48/02* (2013.01); *H04W 76/00* (2013.01); *H04W 36/0022* (2013.01); *H04W 76/16* (2018.02)
(58) Field of Classification Search
  CPC . H04W 76/00; H04W 36/0022; H04W 76/16; H04W 4/12; H04W 76/02; H04L 65/1069
  See application file for complete search history.

(56) References Cited

U.S. PATENT DOCUMENTS

| | | | | |
|---|---|---|---|---|
| 8,989,124 | B1* | 3/2015 | Ramamurthy | H04W 76/12 370/329 |
| 9,380,611 | B2* | 6/2016 | Lin | H04W 76/02 |
| 9,408,067 | B1* | 8/2016 | Hoadley | H04W 76/10 |
| 2010/0278108 | A1* | 11/2010 | Cho | H04W 76/12 370/328 |
| 2010/0318670 | A1* | 12/2010 | Al-Shalash | H04W 76/10 709/229 |
| 2011/0188448 | A1 | 8/2011 | Griot et al. | |
| 2011/0263260 | A1* | 10/2011 | Yavuz | H04W 36/0083 455/437 |
| 2012/0094672 | A1* | 4/2012 | Hunukumbure | H04W 24/08 455/436 |
| 2012/0163202 | A1* | 6/2012 | Aguirre | H04L 41/12 370/252 |
| 2012/0218889 | A1* | 8/2012 | Watfa | H04W 60/04 370/230 |
| 2013/0244672 | A1* | 9/2013 | Lin | H04W 76/02 455/450 |
| 2013/0344873 | A1* | 12/2013 | Sane | H04W 36/30 455/437 |
| 2014/0348014 | A1 | 11/2014 | Teshima et al. | |
| 2015/0230199 | A1* | 8/2015 | Jeong | H04M 15/57 455/458 |
| 2015/0295833 | A1* | 10/2015 | Mizukoshi | H04L 47/125 370/235 |
| 2015/0373699 | A1* | 12/2015 | Xu | H04W 76/10 370/329 |
| 2015/0382251 | A1* | 12/2015 | Wang | H04L 65/1066 455/439 |
| 2015/0382267 | A1 | 12/2015 | Wang et al. | |
| 2016/0134316 | A1* | 5/2016 | Mohan | H04B 7/0413 455/558 |
| 2016/0234744 | A1 | 8/2016 | Wu et al. | |
| 2016/0277992 | A1* | 9/2016 | Cao | H04W 76/27 |
| 2016/0278096 | A1* | 9/2016 | Watfa | H04W 28/0205 |
| 2016/0323805 | A1* | 11/2016 | Ryu | H04W 36/0016 |

FOREIGN PATENT DOCUMENTS

| | | | |
|---|---|---|---|
| CN | 103634855 | A | 3/2014 |
| CN | 104038964 | A | 9/2014 |
| CN | 104427524 | A | 3/2015 |
| CN | 104507131 | A | 4/2015 |
| EP | 3046389 | A1 | 7/2016 |
| JP | 2013502161 | A | 1/2013 |
| JP | 2013123135 | A | 6/2013 |
| JP | 2016538757 | A | 12/2016 |
| KR | 20140021437 | A | 2/2014 |
| RU | 2473188 | C1 | 1/2013 |
| WO | 2014066767 | A1 | 5/2014 |
| WO | 2015/058393 | A1 | 4/2015 |
| WO | 2015069076 | A1 | 5/2015 |
| WO | 2015069158 | A1 | 5/2015 |
| WO | 2017075814 | A1 | 5/2017 |

OTHER PUBLICATIONS

3GPP TS 23.228 V13.3.0, 3rd Generation Partnership Project;Technical Specification Group Services and System Aspects; IP Multimedia Subsystem (IMS); Stage 2 (Release 13), Jun. 2015, total 311 pages.
3GPP TS 23.237 V13.0.0, 3rd Generation Partnership Project; Technical Specification Group Services and System Aspects; IP Multimedia Subsystem (IMS) Service Continuity; Stage 2 (Release 13), Jun. 2015, total 172 pages.
3GPP TS 23.401 V13.3.0, 3rd Generation Partnership Project; Technical Specification Group Services and System Aspects; General Packet Radio Service (GPRS) enhancements for Evolved Universal Terrestrial Radio Access Network (E-UTRAN) access (Release 13), Jun. 2015, total 324 pages.
3GPP TS 24.229 V13.2.1, 3rd Generation Partnership Project;Technical Specification Group Core Network and Terminals; IP multimedia call control protocol based on Session Initiation Protocol (SIP) and Session Description Protocol (SDP); Stage 3 (Release 13), Jun. 2015, total 891 pages.
Decision of Rejection issued in Japanese Application No. 2018-513756 dated May 13, 2019, 9 pages (with English translation).
GOST 7.83—2001,International Standard—The system of standards for information, libraryand publishing-Electronic Editions-Basic views and output,dated Jul. 1, 2002,total 16 pages with 19 pages English translation.
Office Action issued in Chinese Application No. 201580083147.4 dated Sep. 18, 2019, 12 pages.
Office Action issued in Japanese Application No. 2019-12033 dated Apr. 13, 2020, 12 pages (with English translation).

* cited by examiner

S101
An access network device receives, from a core network device, a bearer setup request message of a VoLTE service S102
The access network device rejects the bearer setup request message if determining that LTE network signal quality of a terminal of the VoLTE service cannot satisfy the VoLTE service

SERVICE PROCESSING METHOD AND SERVICE PROCESSING APPARATUS

CROSS-REFERENCE TO RELATED APPLICATIONS

This application is a continuation of International Patent Application No. PCT/CN2015/094597 filed on Nov. 13, 2015, which claims priority to International Patent Application No. PCT/CN2015/089664, filed on Sep. 15, 2015. The disclosures of the aforementioned applications are hereby incorporated by reference in their entireties.

TECHNICAL FIELD

The present disclosure relates to the field of communications technologies, and specifically, to a service processing method and a service processing apparatus.

BACKGROUND

A voice service of a Long Term Evolution (LTE) network is referred to as a Voice over LTE (VoLTE) service. Currently, more operators start to apply VoLTE for commercial use, and more user terminals can support a VoLTE service. Media data of a VoLTE service is carried on a user plane dedicated bearer in an LTE network (currently, it is defined in a standard that a dedicated bearer whose quality of service class identifier is equal to 1 is used). Generally, a requirement of a VoLTE service for LTE network performance is higher than that of a data service.

In an existing mechanism, a VoLTE service creation process is implemented mainly according to whether resources of a cell are sufficient, and when the entire cell still has resources that can satisfy VoLTE, a dedicated bearer of a VoLTE service is established. However, in some scenarios, a VoLTE service established based on the existing mechanism is poor in stability, which sometimes severely affects call experience of a user.

SUMMARY

Embodiments of the present disclosure provide a service processing method, a related apparatus, and a communications system, to improve stability of an established VoLTE service, thereby improving call experience of a user.

A first aspect of the embodiments of the present disclosure provides a service processing method, including:

receiving, by an access network device, from a core network device a bearer setup request message of a VoLTE service; and rejecting, by the access network device, the bearer setup request message when determining that LTE network signal quality of a terminal of the VoLTE service cannot satisfy the VoLTE service.

With reference to the first aspect, in a first possible implementation manner of the first aspect, the rejecting the bearer setup request message includes: sending a response message for rejecting the bearer setup request message to the core network device, where the response message is used by the core network device to trigger the terminal to initiate a circuit switched fallback call.

With reference to the first possible implementation manner of the first aspect, in a second possible implementation manner of the first aspect, the response message carries a cause value for a bearer setup failure of the VoLTE service.

With reference to the first possible implementation manner of the first aspect or the second possible implementation manner of the first aspect, in a third possible implementation manner of the first aspect, the sending a response message for rejecting the bearer setup request message to the core network device includes: sending a response message of the bearer setup request message to a mobility management network element MME, where the response message makes an Internet protocol multimedia subsystem IMS trigger the terminal to initiate the circuit switched fallback call.

With reference to the first aspect or the first possible implementation manner of the first aspect or the second possible implementation manner of the first aspect or the third possible implementation manner of the first aspect, in a fourth possible implementation manner of the first aspect, the access network device determines, based on an LTE network uplink signal quality parameter and/or an LTE network downlink signal quality parameter of the terminal of the VoLTE service, that the LTE network signal quality of the terminal cannot satisfy the VoLTE service.

With reference to the fourth possible implementation manner of the first aspect, in a fifth possible implementation manner of the first aspect, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

With reference to the fourth possible implementation manner of the first aspect or the fifth possible implementation manner of the first aspect, in a sixth possible implementation manner of the first aspect, the LTE network downlink signal quality parameter of the terminal includes: at least one of an LTE network downlink signal strength of the terminal, an LTE network downlink signal-to-noise ratio of the terminal, or a downlink packet loss rate of the terminal.

With reference to the fourth possible implementation manner of the first aspect or the fifth possible implementation manner of the first aspect or the sixth possible implementation manner of the first aspect, in a seventh possible implementation manner of the first aspect, after the receiving, by an access network device, from a core network device, a bearer setup request message of a VoLTE service, the method further includes:

sending, by the access network device, a first measurement control instruction to the terminal; and receiving, by the access network device, a first measurement report sent by the terminal in response to the first measurement control instruction, where the first measurement report carries the LTE network downlink signal quality parameter of the terminal; and the first measurement control instruction may be used to instruct the terminal to measure the LTE network signal quality.

With reference to the first aspect or any possible implementation manner of the first to the seventh possible implementation manners of the first aspect, in an eighth possible implementation manner of the first aspect, the terminal is a calling terminal or a called terminal of the VoLTE service.

With reference to the first aspect or any possible implementation manner of the first to the eighth possible implementation manners of the first aspect, in a ninth possible implementation manner of the first aspect, the terminal is a calling terminal or a called terminal of the VoLTE service; and a bearer of the VoLTE service is a bearer whose quality of service class identifier QCI=1.

With reference to the first aspect or any possible implementation manner of the first to the ninth possible implementation manners of the first aspect, in a tenth possible implementation manner of the first aspect, before the rejecting the bearer setup request message, the method further includes: determining, by the access network device, that the terminal has registered with a circuit switched domain.

With reference to the tenth possible implementation manner of the first aspect, in an eleventh possible implementation manner of the first aspect, the method further includes:

receiving, by the access network device, a notification message from the core network device, where the notification message carries indication information used to indicate that the terminal has registered with the circuit switched domain, where the access network device determines, based on the notification message, that the terminal has registered with the circuit switched domain.

With reference to the tenth possible implementation manner of the first aspect or the eleventh possible implementation manner of the first aspect, in a twelfth possible implementation manner of the first aspect, after the receiving, by an access network device, from a core network device, a bearer setup request message of a VoLTE service, and before the rejecting the bearer setup request message, the method further includes: determining, by the access network device, that 2G/3G network signal quality of the terminal satisfies a voice service.

With reference to the twelfth possible implementation manner of the first aspect, in a thirteenth possible implementation manner of the first aspect, after the receiving, by an access network device, from a core network device, a bearer setup request message of a VoLTE service, the method further includes: sending, by the access network device, a second measurement control instruction to the terminal, where the second measurement control instruction is used to instruct the terminal to measure the 2G/3G network signal quality; and receiving, by the access network device, a second measurement report sent by the terminal in response to the second measurement control instruction, where the second measurement report carries a 2G/3G network downlink signal quality parameter of the terminal.

A second aspect of the embodiments of the present disclosure provides a service processing method, including:

receiving, by a terminal, from an Internet protocol multimedia subsystem IMS network, a call request message of a VoLTE service; and rejecting, by the terminal, the call request message when determining that LTE network signal quality of the terminal cannot satisfy the VoLTE service.

With reference to the second aspect, in a first possible implementation manner of the second aspect, the rejecting the call request message includes: sending, by the terminal, a response message for rejecting the call request message to the IMS network, where the response message is used in the IMS network to trigger the terminal to initiate a circuit switched fallback call.

With reference to the second aspect or the first possible implementation manner of the second aspect, in a second possible implementation manner of the second aspect, the terminal determines, based on an LTE network uplink signal quality parameter and/or an LTE network downlink signal quality parameter of the terminal, that the LTE network signal quality of the terminal cannot satisfy the VoLTE service.

With reference to the second possible implementation manner of the second aspect, in a third possible implementation manner of the second aspect, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

With reference to the second possible implementation manner of the second aspect or the third possible implementation manner of the second aspect, in a fourth possible implementation manner of the second aspect, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

With reference to the second aspect or any possible implementation manner of the first to the fourth possible implementation manners of the second aspect, in a fifth possible implementation manner of the second aspect, the call request message is an invite message.

With reference to the fifth possible implementation manner of the second aspect, in a sixth possible implementation manner of the second aspect, the response message is a temporarily unavailable response message.

A third aspect of the embodiments of the present disclosure provides a service processing method, which may include:

receiving, by a terminal, a user instruction that instructs to establish a VoLTE service; and calling, by the terminal, a called terminal of the VoLTE service in a circuit switched domain when determining that LTE network signal quality of the terminal cannot satisfy the VoLTE service, where for example, the circuit switched domain includes a circuit switched domain of a 2G/3G network and/or a 1×RTT network of a CDMA network.

With reference to the third aspect, in a first possible implementation manner of the third aspect, the terminal determines, based on an LTE network uplink signal quality parameter and/or an LTE network uplink signal quality parameter of the terminal, that the LTE network signal quality of the terminal cannot satisfy the VoLTE service.

With reference to the first possible implementation manner of the third aspect, in a second possible implementation manner of the second aspect, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

With reference to the first possible implementation manner of the third aspect or the second possible implementation manner of the third aspect, in a third possible implementation manner of the third aspect, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

With reference to the third aspect or any possible implementation manner of the first to the third possible implementation manners of the third aspect, in a fourth possible implementation manner of the third aspect, after the receiving a user instruction that instructs to establish a VoLTE service, the method further includes: measuring, by the terminal, LTE network downlink signal quality, to obtain the LTE network downlink signal quality parameter of the terminal.

With reference to the third aspect or any possible implementation manner of the first to the fourth possible implementation manners of the third aspect, in a fifth possible implementation manner of the third aspect, before the calling a called terminal of the VoLTE service in a circuit switched domain, the method further includes: determining, by the terminal, that the terminal has registered with the circuit switched domain.

With reference to the third aspect or any possible implementation manner of the first to the fourth possible implementation manners of the third aspect, in a sixth possible implementation manner of the third aspect, before the calling a called terminal of the VoLTE service in a circuit switched domain, the method further includes: registering, by the terminal, with the circuit switched domain when the terminal has not registered with the circuit switched domain.

With reference to the sixth possible implementation manner of the third aspect, in a seventh possible implementation manner of the third aspect, the registering, by the terminal, with the circuit switched domain includes: registering, by the terminal, with the circuit switched domain in a combined attach manner, or camping, by the terminal, on the circuit switched domain by means of a reselection process, and registering with the circuit switched domain.

With reference to any possible implementation manner of the fifth to the seventh possible implementation manners of the third aspect, in an eighth possible implementation manner of the third aspect, before the calling a called terminal of the VoLTE service in a circuit switched domain, the method further includes: determining, by the terminal, that network signal quality of the circuit switched domain satisfies a voice service.

With reference to the third aspect or any possible implementation manner of the first to the eighth possible implementation manners of the third aspect, in a ninth possible implementation manner of the third aspect, before the calling, by the terminal, a called terminal of the VoLTE service in a circuit switched domain when determining that signal quality of the terminal cannot satisfy the VoLTE service, the method further includes: receiving, by the terminal, a notification message from the Long Term Evolution network, where the notification message carries a Long Term Evolution network uplink signal quality parameter and/or a Long Term Evolution network downlink signal quality parameter of the terminal, and the notification message is used by the terminal to determine that the Long Term Evolution network signal quality of the terminal cannot satisfy the VoLTE service.

With reference to the ninth possible implementation manner of the third aspect, in a tenth possible implementation manner of the third aspect, the notification message is from an access network device of the Long Term Evolution network.

A fourth aspect of the embodiments of the present disclosure provides an access network device, including:

a receiving unit, configured to receive, from a core network device, a bearer setup request message of a VoLTE service; and a service control unit, configured to reject the bearer setup request message when determining that LTE network signal quality of a terminal of the VoLTE service cannot satisfy the VoLTE service.

With reference to the fourth aspect, in a first possible implementation manner of the fourth aspect, the service control unit is specifically configured to: when determining that the LTE network signal quality of the terminal of the VoLTE service cannot satisfy the VoLTE service, send a response message for rejecting the bearer setup request message to the core network device, where the response message is used by the core network device to trigger the terminal to initiate a circuit switched fallback call.

With reference to the first possible implementation manner of the fourth aspect, in a second possible implementation manner of the fourth aspect, the response message carries a cause value for a bearer setup failure of the VoLTE service.

With reference to the first possible implementation manner of the fourth aspect or the second possible implementation manner of the fourth aspect, in a third possible implementation manner of the fourth aspect, the service control unit is specifically configured to: when determining that the LTE network signal quality of the terminal of the VoLTE service cannot satisfy the VoLTE service, send a response message of the bearer setup request message to a mobility management network element MME, where the response message makes an Internet protocol multimedia subsystem IMS trigger the terminal to initiate the circuit switched fallback call.

With reference to the fourth aspect or the first possible implementation manner of the fourth aspect or the second possible implementation manner of the fourth aspect or the third possible implementation manner of the fourth aspect, in a fourth possible implementation manner of the fourth aspect, the access network device determines, based on an LTE network uplink signal quality parameter and/or an LTE network downlink signal quality parameter of the terminal of the VoLTE service, that the LTE network signal quality of the terminal cannot satisfy the VoLTE service.

With reference to the fourth possible implementation manner of the fourth aspect, in a fifth possible implementation manner of the fourth aspect, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

With reference to the fourth possible implementation manner of the fourth aspect or the fifth possible implementation manner of the fourth aspect, in a sixth possible implementation manner of the fourth aspect, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

With reference to the fourth possible implementation manner of the fourth aspect or the fifth possible implementation manner of the fourth aspect or the sixth possible implementation manner of the fourth aspect, in a seventh possible implementation manner of the fourth aspect, the access network device further includes a sending unit, configured to: after the receiving unit receives, from the core network device, the bearer setup request message of the VoLTE service, send a first measurement control instruction to the terminal, where the receiving unit is further configured to receive a first measurement report sent by the terminal in response to the first measurement control instruction, and the first measurement report carries the LTE network downlink signal quality parameter of the terminal.

With reference to the fourth aspect or any possible implementation manner of the first to the seventh possible implementation manners of the fourth aspect, in an eighth possible implementation manner of the fourth aspect, the terminal is a calling terminal or a called terminal of the VoLTE service.

With reference to the fourth aspect or any possible implementation manner of the first to the eighth possible implementation manners of the fourth aspect, in a ninth possible implementation manner of the fourth aspect, a bearer of the VoLTE service is a bearer whose a quality of service class identifier QCI=1.

With reference to the fourth aspect or any possible implementation manner of the first to the ninth possible implementation manners of the fourth aspect, in a tenth possible implementation manner of the fourth aspect, the service control unit is further configured to: before rejecting the bearer setup request message, determine that the terminal has registered with a circuit switched domain.

With reference to the tenth possible implementation manner of the fourth aspect, in an eleventh possible implementation manner of the fourth aspect, the receiving unit is further configured to receive a notification message from the core network device, where the notification message carries indication information used to indicate that the terminal has registered with the circuit switched domain, where the service control unit determines, based on the notification message, that the terminal has registered with the circuit switched domain.

With reference to the tenth possible implementation manner of the fourth aspect or the eleventh possible implementation manner of the fourth aspect, in a twelfth possible implementation manner of the fourth aspect, the service control unit is further configured to: after the bearer setup request message of the VoLTE service is received from the core network device, and before the bearer setup request message is rejected, determine that 2G/3G network signal quality of the terminal satisfies a voice service.

With reference to the twelfth possible implementation manner of the fourth aspect, in a thirteenth possible implementation manner of the fourth aspect, the access network device further includes a sending unit, configured to: after the bearer setup request message of the VoLTE service is received from the core network device, send a second measurement control instruction to the terminal, where the second measurement control instruction is used to instruct the terminal to measure the 2G/3G network signal quality; and the receiving unit is further configured to receive a second measurement report sent by the terminal in response to the second measurement control instruction, where the second measurement report carries a 2G/3G network downlink signal quality parameter of the terminal.

A fifth aspect of the embodiments of the present disclosure provides a terminal, including:

a receiving unit, configured to receive, from an Internet protocol multimedia subsystem IMS network, a call request message of a VoLTE service; and a service control unit, configured to reject the call request message when determining that LTE network signal quality of the terminal cannot satisfy the VoLTE service.

With reference to the fifth aspect, in a first possible implementation manner of the fifth aspect, the rejecting the call request message includes: sending, by the terminal, a response message for rejecting the call request message to the IMS network, where the response message is used in the IMS network to trigger the terminal to initiate a circuit switched fallback call.

With reference to the fifth aspect or the first possible implementation manner of the fifth aspect, in a second possible implementation manner of the fifth aspect, the terminal determines, based on an LTE network uplink signal quality parameter and/or an LTE network downlink signal quality parameter of the terminal, that the LTE network signal quality of the terminal cannot satisfy the VoLTE service.

With reference to the second possible implementation manner of the fifth aspect, in a third possible implementation manner of the fifth aspect, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

With reference to the second possible implementation manner of the fifth aspect or the third possible implementation manner of the fifth aspect, in a fourth possible implementation manner of the fifth aspect, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

With reference to the fifth aspect or any possible implementation manner of the first to the fourth possible implementation manners of the fifth aspect, in a fifth possible implementation manner of the fifth aspect, the call request message is an invite message.

With reference to the fifth possible implementation manner of the fifth aspect, in a sixth possible implementation manner of the fifth aspect, the response message is a temporarily unavailable response message.

A sixth aspect of the embodiments of the present disclosure provides a terminal, including:

a receiving unit, configured to receive a user instruction that instructs to establish a VoLTE service; and a service control unit, configured to call a called terminal of the VoLTE service in a circuit switched domain when determining that the LTE network signal quality of the terminal cannot satisfy the VoLTE service.

With reference to the sixth aspect, in a first possible implementation manner of the sixth aspect, the service processing unit determines, based on an LTE network uplink signal quality parameter and/or an LTE network uplink signal quality parameter of the terminal, that the LTE network signal quality of the terminal cannot satisfy the VoLTE service.

With reference to the first possible implementation manner of the sixth aspect, in a second possible implementation manner of the second aspect, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

With reference to the first possible implementation manner of the sixth aspect or the second possible implementation manner of the sixth aspect, in a third possible implementation manner of the sixth aspect, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

With reference to the sixth aspect or any possible implementation manner of the first to the third possible implementation manners of the sixth aspect, in a fourth possible implementation manner of the sixth aspect, the terminal further includes: a measurement unit, configured to: after the user instruction that instructs to establish the VoLTE service is received, measure LTE network downlink signal quality, to obtain the LTE network downlink signal quality parameter of the terminal.

With reference to the sixth aspect or any possible implementation manner of the first to the fourth possible implementation manners of the sixth aspect, in a fifth possible implementation manner of the sixth aspect, the service control unit is further configured to: before calling the called terminal of the VoLTE service in the circuit switched domain, determine that the terminal has registered with the circuit switched domain.

With reference to the sixth aspect or any possible implementation manner of the first to the fourth possible implementation manners of the sixth aspect, in a sixth possible implementation manner of the sixth aspect, the service control unit is further configured to: before calling the called terminal of the VoLTE service in the circuit switched domain, register with the circuit switched domain when the terminal has not registered with the circuit switched domain.

With reference to the sixth possible implementation manner of the sixth aspect, in a seventh possible implementation manner of the sixth aspect, the registering, by the service control unit, with the circuit switched domain includes: registering with the circuit switched domain in a combined attach manner, or camping on the circuit switched domain by means of a reselection process, and registering with the circuit switched domain.

With reference to any possible implementation manner of the fifth to the seventh possible implementation manners of the sixth aspect, in an eighth possible implementation manner of the sixth aspect, the service control unit is further configured to: before calling the called terminal of the VoLTE service in the circuit switched domain, determine that network signal quality of the circuit switched domain satisfies a voice service.

With reference to the sixth aspect or any possible implementation manner of the first to the eighth possible implementation manners of the sixth aspect, in a ninth possible implementation manner of the sixth aspect, the receiving unit is further configured to: before the service control unit calls the called terminal of the VoLTE service in the circuit switched domain, receive a notification message from the Long Term Evolution network, where the notification message carries a Long Term Evolution network uplink signal quality parameter and/or a Long Term Evolution network downlink signal quality parameter of the terminal, and the notification message is used by the processor to determine that the Long Term Evolution network signal quality of the terminal cannot satisfy the VoLTE service.

With reference to the ninth possible implementation manner of the sixth aspect, in a tenth possible implementation manner of the sixth aspect, the notification message is from an access network device of the Long Term Evolution network.

A seventh aspect of the embodiments of the present disclosure provides an access network device, including:

a network interface, configured to receive, from a core network device, a bearer setup request message of a VoLTE service; and a processor, configured to reject the bearer setup request message when determining that LTE network signal quality of a terminal of the VoLTE service cannot satisfy the VoLTE service.

With reference to the seventh aspect, in a first possible implementation manner of the seventh aspect, the processor is specifically configured to: when determining that the LTE network signal quality of the terminal of the VoLTE service cannot satisfy the VoLTE service, send, by using the network interface, a response message for rejecting the bearer setup request message to the core network device, where the response message is used by the core network device to trigger the terminal to initiate a circuit switched fallback call.

With reference to the first possible implementation manner of the seventh aspect, in a second possible implementation manner of the seventh aspect, the response message carries a cause value for a bearer setup failure of the VoLTE service.

With reference to the first possible implementation manner of the seventh aspect or the second possible implementation manner of the seventh aspect, in a third possible implementation manner of seventh aspect, the processor is specifically configured to: when determining that the signal quality of the terminal of the VoLTE service cannot satisfy the VoLTE service, send a response message of the bearer setup request message to a mobility management network element MME by using the network interface, where the response message makes an Internet protocol multimedia subsystem IMS trigger the terminal to initiate the circuit switched fallback call.

With reference to the seventh aspect or the first possible implementation manner of the seventh aspect or the second possible implementation manner of the seventh aspect or the third possible implementation manner of the seventh aspect, in a fourth possible implementation manner of the seventh aspect, the processor determines, based on an LTE network uplink signal quality parameter and/or an LTE network downlink signal quality parameter of the terminal of the VoLTE service, that the LTE network signal quality of the terminal cannot satisfy the VoLTE service.

With reference to the fourth possible implementation manner of the seventh aspect, in a fifth possible implementation manner of the seventh aspect, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

With reference to the fourth possible implementation manner of the seventh aspect or the fifth possible implementation manner of the seventh aspect, in a sixth possible implementation manner of the seventh aspect, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

With reference to the fourth possible implementation manner of the seventh aspect or the fifth possible implementation manner of the seventh aspect or the sixth possible implementation manner of the seventh aspect, in a seventh possible implementation manner of the seventh aspect, the processor is further configured to: after the bearer setup request message of the VoLTE service is received from the core network device, send a first measurement control instruction to the terminal by using the network interface; and receive, by using the network interface, a first measurement report sent by the terminal in response to the first measurement control instruction, where the first measurement report carries the LTE network downlink signal quality parameter of the terminal.

With reference to the seventh aspect or any possible implementation manner of the first to the seventh possible implementation manners of the seventh aspect, in an eighth possible implementation manner of the seventh aspect, the terminal is a calling terminal or a called terminal of the VoLTE service.

With reference to the seventh aspect or any possible implementation manner of the first to the eighth possible implementation manners of the seventh aspect, in a ninth possible implementation manner of the seventh aspect, a bearer of the VoLTE service is a bearer whose quality of service class identifier QCI=1.

With reference to the seventh aspect or any possible implementation manner of the first to the eighth possible implementation manners of the seventh aspect, in a ninth possible implementation manner of the seventh aspect, the processor is further configured to: before rejecting the bearer setup request message, determine that the terminal has registered with a circuit switched domain.

With reference to the ninth possible implementation manner of the seventh aspect, in a tenth possible implementation manner of the seventh aspect, the network interface is further configured to receive a notification message from the core network device, where the notification message carries indication information used to indicate that the terminal has registered with the circuit switched domain; and the processor determines, based on the notification message, that the terminal has registered with the circuit switched domain.

With reference to the ninth possible implementation manner or the tenth possible implementation manner of the seventh aspect, in an eleventh possible implementation manner of the seventh aspect, the processor is further configured to: after the bearer setup request message of the VoLTE service is received from the core network device, and before the bearer setup request message is rejected, determine that 2G/3G network signal quality of the terminal satisfies a voice service.

With reference to the tenth possible implementation manner of the seventh aspect, in a twelfth possible implementation manner of the seventh aspect, the network interface is further configured to: after receiving, from the core network device, the bearer setup request message of the VoLTE service, send a second measurement control instruction to the terminal, where the second measurement control instruction is used to instruct the terminal to measure the 2G/3G network signal quality; and receive a second measurement report sent by the terminal in response to the second measurement control instruction, where the second measurement report carries a 2G/3G network downlink signal quality parameter of the terminal.

An eighth aspect of the present disclosure provides a terminal, including:
a receiver, configured to receive, from an Internet protocol multimedia subsystem IMS network, a call request message of a VoLTE service; and
a processor, configured to reject the call request message when determining that LTE network signal quality of the terminal cannot satisfy the VoLTE service.

With reference to the eighth aspect, in a first possible implementation manner of the eighth aspect, the terminal further includes a transmitter, where
the processor is specifically configured to send, to the IMS network by using the transmitter, a response message for rejecting the call request message, where the response message is used in the IMS network to trigger the terminal to initiate a circuit switched fallback call.

With reference to the eighth aspect or the first possible implementation manner of the eighth aspect, in a second possible implementation manner of the eighth aspect, the processor determines, based on an LTE network uplink signal quality parameter and/or an LTE network downlink signal quality parameter of the terminal, that the LTE network signal quality of the terminal cannot satisfy the VoLTE service.

With reference to the second possible implementation manner of the eighth aspect, in a third possible implementation manner of the eighth aspect, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

With reference to the second possible implementation manner of the eighth aspect or the third possible implementation manner of the eighth aspect, in a fourth possible implementation manner of the eighth aspect, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

With reference to the eighth aspect or any possible implementation manner of the first to the fourth possible implementation manners of the eighth aspect, in a fifth possible implementation manner of the eighth aspect, the call request message is an invite message.

With reference to the fifth possible implementation manner of the eighth aspect, in a sixth possible implementation manner of the eighth aspect, the response message is a temporarily unavailable response message.

A ninth aspect of the embodiments of the present disclosure provides a terminal, including:
a user interface, configured to receive a user instruction that instructs to establish a VoLTE service; and
a processor, configured to initiate a call to a called terminal of the VoLTE service in a circuit switched domain when determining that LTE network signal quality of the terminal cannot satisfy the VoLTE service.

With reference to the ninth aspect, in a first possible implementation manner of the ninth aspect, the processor determines, based on an LTE network uplink signal quality parameter and/or an LTE network uplink signal quality parameter of the terminal, that the LTE network signal quality of the terminal cannot satisfy the VoLTE service.

With reference to the first possible implementation manner of the ninth aspect, in a second possible implementation manner of the second aspect, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

With reference to the first possible implementation manner of the ninth aspect or the second possible implementation manner of the ninth aspect, in a third possible implementation manner of the ninth aspect, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

With reference to the ninth aspect or any possible implementation manner of the first to the third possible implementation manners of the ninth aspect, in a fourth possible implementation manner of the ninth aspect,
the processor is further configured to: after receiving the user instruction that instructs to establish the VoLTE service, measure LTE network downlink signal quality, to obtain the LTE network downlink signal quality parameter of the terminal.

With reference to the ninth aspect or any possible implementation manner of the first to the fourth possible implementation manners of the ninth aspect, in a fifth possible implementation manner of the ninth aspect, the processor is further configured to: before calling the called terminal of the VoLTE service in the circuit switched domain, determine that the terminal has registered with the circuit switched domain.

With reference to the ninth aspect or any possible implementation manner of the first to the third possible implementation manners of the ninth aspect, in a sixth possible implementation manner of the ninth aspect, the processor is further configured to: before calling the called terminal of the VoLTE service in the circuit switched domain, register with the circuit switched domain when the terminal has not registered with the circuit switched domain.

With reference to the sixth possible implementation manner of the ninth aspect, in a seventh possible implementation manner of the ninth aspect, the registering, by the processor, with the circuit switched domain includes: registering with the circuit switched domain in a combined attach manner, or camping on the circuit switched domain by means of a reselection process, and registering with the circuit switched domain.

With reference to any possible implementation manner of the fifth to the seventh possible implementation manners of the ninth aspect, in an eighth possible implementation manner of the ninth aspect, the processor is further configured to: before calling the called terminal of the VoLTE service in the circuit switched domain, determine that network signal quality of the circuit switched domain satisfies a voice service.

With reference to the ninth aspect or any possible implementation manner of the first to the eighth possible implementation manners of the ninth aspect, in a ninth possible implementation manner of the ninth aspect, the terminal further includes a network interface, where the network interface is configured to: before the processor calls the called terminal of the VoLTE service in the circuit switched domain, receive a notification message from the Long Term Evolution network, where the notification message carries a Long Term Evolution network uplink signal quality parameter and/or a Long Term Evolution network downlink signal quality parameter of the terminal, and the notification message is used by the processor to determine that the Long Term Evolution network signal quality of the terminal cannot satisfy the VoLTE service.

With reference to the ninth possible implementation manner of the ninth aspect, in a tenth possible implementation manner of the ninth aspect, the notification message is from an access network device of the Long Term Evolution network.

A tenth aspect of the present disclosure further provides a communications system, including:

a core network device and an access network device, where the access network device is any one of the access network devices provided in the embodiments of the present disclosure.

The tenth aspect of the present disclosure further provides a service processing method, including:

sending, by a core network device of a Long Term Evolution network, a bearer setup request message of a VoLTE service to an access network device of the Long Term Evolution network; and sending, by the core network device, a notification message to the access network device, where the notification message carries indication information used to indicate that a terminal of the VoLTE service has registered with a circuit switched domain, and the notification message is used by the access network device to: when determining that signal quality of the terminal of the VoLTE service cannot satisfy the VoLTE service, before the bearer setup request message is rejected, determine that the terminal has registered with the circuit switched domain.

An eleventh aspect of the present disclosure further provides a core network device, including: a network interface and a processor, where the network interface is configured to send a bearer setup request message of a VoLTE service to an access network device; and send a notification message to the access network device, where the notification message carries indication information used to indicate that a terminal of the VoLTE service has registered with a circuit switched domain, and the notification message is used by the access network device to: when determining that signal quality of the terminal of the VoLTE service cannot satisfy the VoLTE service, before the bearer setup request message is rejected, determine that the terminal has registered with the circuit switched domain.

It may be learned that, in the solutions of some embodiments of the present disclosure, after an access network device receives, from a core network device, a bearer setup request message of a VoLTE service, the access network device rejects the bearer setup request message when determining that LTE network signal quality of a terminal of the VoLTE service cannot satisfy the VoLTE service. That is, in a bearer setup process of the VoLTE service, if the access network device finds that the LTE network signal quality of the terminal cannot satisfy the VoLTE service, the access network device stops bearer setup of the VoLTE service, to help to some extent improve stability of a established VoLTE service, thereby improving call experience of a user.

BRIEF DESCRIPTION OF DRAWINGS

To describe the technical solutions in the embodiments of the present disclosure more clearly, the following briefly describes the accompanying drawings required for describing the embodiments and the prior art. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

Embodiments of the present disclosure provide a service processing method, a related apparatus, and a communications system, to improve stability of an established VoLTE service, thereby improving call experience of a user.

To make the disclosure objectives, features, and advantages of the present disclosure clearer and more comprehensible, the following clearly describes the technical solutions in the embodiments of the present disclosure with reference to the accompanying drawings in the embodiments of the present disclosure. Apparently, the embodiments described in the following are merely a part rather than all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figures 1A, 1B:
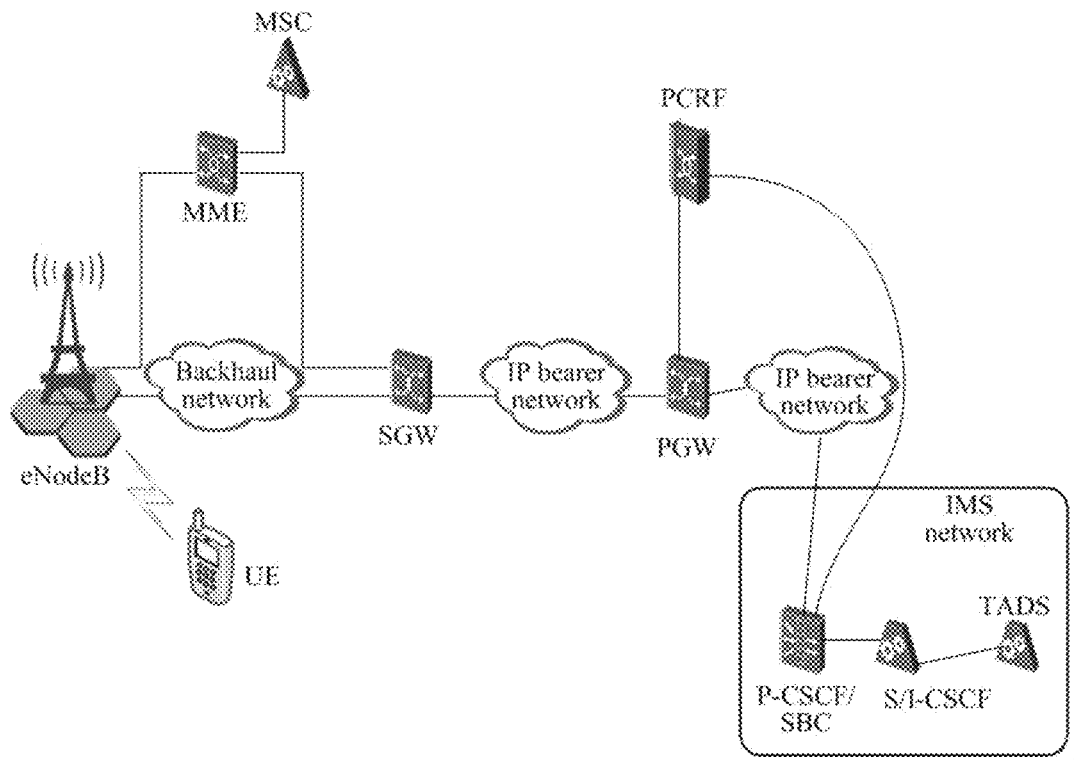
FIG. 1A is a schematic diagram of a network deployment architecture according to an illustrative embodiment of the present disclosure.
FIG. 1B is a schematic flowchart of a service processing method according to an illustrative embodiment of the present disclosure.

Referring to FIG. 1-a, FIG. 1-a is a schematic diagram of a communications network architecture according to an illustrative embodiment of the present disclosure. An evolved NodeB (eNB) may be in communication connection with UE by using a radio link. A core network device of an LTE network in the illustrative architecture shown in FIG. 1-a includes a mobility management entity (MME), a serving gateway (SGW), a packet data network gateway (PGW), and the like. The core network device may be responsible for playing a connection role in accessing a VoLTE service of UE to an IMS network, and responsible for transferring VoLTE call-related signaling between the UE and the IMS network, and may be further responsible for setting up a related dedicated bearer (for example, a dedicated bearer whose quality of service class identifier (QCI, QoS Class Identifier) is equal to 1) used to transfer related user plane data (media data) of the VoLTE service.

A P-CSCF (Proxy Call Session Control Function, which may be classified into a calling-party P-CSCF and a called-party P-CSCF) is the first contact point by using which UE accesses an Internet protocol multimedia subsystem (IMS) network in a VoLTE service process. The P-CSCF may be responsible for serving as an agent of all VoLTE-related signaling and completing routing control. In a VoLTE call process, the P-CSCF may be further responsible for sending a related control message or the like to a policy and charging rules function (PCRF) entity.

An S-CSCF (which may be classified into a calling-party S-CSCF and a called-party S-CSCF) is a service switching center of an IMS network, and the S-CSCF may be mainly responsible for receiving and processing a UE registration request, user management, session control, service switching, service control, SIP message processing and charging, and the like. The S-CSCF may further trigger, according to a trigger rule of an application, a session initiation protocol (SIP) request or the like to a corresponding domain selection service device.

A terminating access domain selection (TADS) may be responsible for connecting a called voice session to a corresponding domain (for example, a CS domain or an IMS domain). The terminating access domain selection may determine whether to initiate a VoLTE call (which is correspondingly connected to an IMS domain) or a conventional circuit switched call (which is correspondingly connected to a CS domain) to UE.

Some technical solutions of the embodiments of the present disclosure may be specifically implemented based on the illustrative communications network architecture shown in FIG. 1-a or a variation architecture thereof. The technical solutions of the embodiments of the present disclosure strive to improve stability of an established VoLTE service, thereby improving call experience of a user.

The following first provides a description from a perspective of an access network device.

Referring to FIG. 1-b, FIG. 1-b is a schematic flowchart of a service processing method according to an embodiment of the present disclosure. As shown in an example in FIG. 1-b, a service processing method provided in an embodiment of the present disclosure may include the following steps.

S101: An access network device receives, from a core network device, a bearer setup request message of a VoLTE service.

The access network device may be an access network device of a calling terminal of the VoLTE service, or may be an access network device of a called terminal of the VoLTE service.

The access network device may be an eNB or another device that is used for radio access of a terminal.

The core network device may be, for example, an MME or another device that may initiate or transfer a bearer setup request message.

S102: The access network device rejects the bearer setup request message if determining that LTE network signal quality of a terminal of the VoLTE service cannot satisfy the VoLTE service.

The terminal may be a calling terminal or a called terminal of the VoLTE service.

The terminal may specifically be user equipment (UE) or a communications terminal in another form.

It may be understood that, that the LTE network signal quality of the terminal of the VoLTE service cannot satisfy the VoLTE service may specifically refer to: The LTE network signal quality of the terminal of the VoLTE service cannot satisfy a user plane bearer (for example, a bearer whose QCI=1) of the VoLTE service, that is, the LTE network signal quality of the terminal of the VoLTE service cannot meet an LTE network signal quality condition for (required by) a user plane bearer of the VoLTE service.

It may be learned that, in the technical solution of this embodiment, after an access network device receives, from a core network device, a bearer setup request message of a VoLTE service, the access network device rejects the bearer setup request message if determining that LTE network signal quality of a terminal of the VoLTE service cannot satisfy the VoLTE service. That is, in a bearer setup process of the VoLTE service, if the access network device finds that the LTE network signal quality of the terminal cannot satisfy the VoLTE service, the access network device stops bearer setup of the VoLTE service, to help to some extent improve stability of an established VoLTE service, thereby improving call experience of a user. For example, currently, there are still many areas having weak LTE network coverage, and an operator is incapable of ensuring that LTE network signal quality of an LTE network of each area is good. For example, generally, cell-edge coverage of an LTE network is often relatively weak, and after the technical solutions of this embodiment is used, because of the weak coverage of the LTE network cell edge, the terminal may be incapable of initiating setup of a VoLTE service in these areas, which further helps enable the terminal to establish a call service in another manner, and helps improve stability of the successfully established call service.

Optionally, the rejecting the bearer setup request message may include: sending a response message for rejecting the bearer setup request message to the core network device, where the response message is used by the core network device to trigger the terminal to initiate a circuit switched fallback call. Certainly, the access network device may reject the bearer setup request message in another manner, for example, directly ignore the received bearer setup request message.

It may be understood that, the response message is used by the core network device to directly or indirectly trigger the terminal to initiate a circuit switched fallback (CSFB) call. Specifically, for example, the response message is used by the core network device to trigger, by means of an IMS network, the terminal to initiate the circuit switched fallback call. For example, generally, cell-edge coverage of an LTE network is often relatively weak, and because of the weak cell-edge coverage of the LTE network, the terminal may be incapable of initiating setup of a VoLTE service in these areas. The response message is used by the core network device to trigger the terminal to initiate the circuit switched fallback call, and enable the terminal to establish a call service in a circuit switched manner, to help improve stability of the successfully established call service.

Optionally, the response message may further carry a cause value for a bearer setup failure of the VoLTE service.

Optionally, the sending a response message for rejecting the bearer setup request message to the core network device may include: sending a response message of the bearer setup request message to an MME, where the response message makes an Internet protocol multimedia subsystem IMS trigger the terminal to initiate the circuit switched fallback call.

Optionally, the access network device may determine, based on, for example, an LTE network uplink signal quality parameter and/or an LTE network downlink signal quality parameter of the terminal of the VoLTE service, that the LTE network signal quality of the terminal cannot satisfy the VoLTE service.

Optionally, the LTE network uplink signal quality parameter of the terminal may include: at least one of an LTE network uplink signal strength of the terminal, an LTE network uplink signal-to-noise ratio of the terminal, or an LTE network uplink packet loss rate of the terminal. Specifically, for example, if the LTE network uplink signal strength of the terminal is less than a first threshold, the LTE network uplink signal-to-noise ratio of the terminal is less than a second threshold, and/or the LTE network uplink packet loss rate of the terminal is greater than a third threshold, it may be considered that LTE network uplink signal quality of the terminal cannot satisfy the VoLTE service.

Optionally, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal. Specifically, for example, if the LTE network downlink signal strength of the terminal is less than a fourth threshold, the LTE network downlink signal-to-noise ratio of the terminal is less than a fifth threshold, and/or the LTE network downlink packet loss rate of the terminal is greater than a sixth threshold, it may be considered that LTE network downlink signal quality of the terminal cannot satisfy the VoLTE service.

It may be understood that, a case of determining, based on both the LTE network uplink signal quality parameter and the LTE network downlink signal quality parameter of the terminal of the VoLTE service, whether the LTE network signal quality of the terminal can satisfy the VoLTE service may be deduced by analogy.

Optionally, after the receiving, by an access network device, from a core network device, a bearer setup request message of a VoLTE service, the method may further include: sending, by the access network device, a first measurement control instruction to the terminal; and receiving, by the access network device, a first measurement report sent by the terminal in response to the first measurement control instruction, where the first measurement report carries the LTE network downlink signal quality parameter of the terminal. That is, after the access network device receives, from the core network device, the bearer setup request message of the VoLTE service, the access network device may instruct the terminal to obtain the LTE network downlink signal quality parameter of the terminal in real time, and may determine, according to the LTE network downlink signal quality parameter obtained by the terminal in real time, whether the LTE network signal quality of the terminal can satisfy the VoLTE service.

Optionally, in some possible implementation manners of the present disclosure, before the rejecting the bearer setup request message, the method further includes: determining, by the access network device, that the terminal has registered with a circuit switched domain. That is, the access network device may reject the bearer setup request message only when determining that the terminal has registered with the circuit switched domain, and when the access network device determines that the terminal has not registered with the circuit switched domain, even though the access network device determines that the LTE network signal quality of the terminal of the VoLTE service cannot satisfy the VoLTE service, the access network device may not reject the bearer setup request message.

Optionally, in some possible implementation manners of the present disclosure, the method further includes: receiving, by the access network device, a notification message from the core network device, where the notification message carries indication information used to indicate that the terminal has registered with the circuit switched domain, where the access network device may determine, based on the notification message, that the terminal has registered with the circuit switched domain. Certainly, the access network device may determine, based on another manner, whether the terminal has registered with the circuit switched domain.

Optionally, in some possible implementation manners of the present disclosure, after the receiving, by an access network device, from a core network device, a bearer setup request message of a VoLTE service, and before the rejecting the bearer setup request message, the method may further include: determining, by the access network device, that 2G/3G (second-generation mobile communications/third-generation mobile communications) network signal quality of the terminal satisfies a voice service.

Optionally, the access network device may determine, based on, for example, a 2G/3G network uplink signal quality parameter and/or a 2G/3G network downlink signal quality parameter of the terminal of the VoLTE service, that the 2G/3G network signal quality of the terminal cannot satisfy the VoLTE service.

Optionally, the 2G/3G network uplink signal quality parameter of the terminal may include: at least one of a 2G/3G network uplink signal strength of the terminal, a 2G/3G network uplink signal-to-noise ratio of the terminal, or a 2G/3G network uplink packet loss rate of the terminal. Specifically, for example, if the 2G/3G network uplink signal strength of the terminal is less than a seventh threshold, the 2G/3G network uplink signal-to-noise ratio of the terminal is less than an eighth threshold, and/or the 2G/3G network uplink packet loss rate of the terminal is greater than a ninth threshold, it may be considered that 2G/3G network uplink signal quality of the terminal cannot satisfy the voice service.

Optionally, the 2G/3G network downlink signal quality parameter of the terminal includes: at least one of a 2G/3G network downlink signal strength of the terminal, a 2G/3G network downlink signal-to-noise ratio of the terminal, or a 2G/3G network downlink packet loss rate of the terminal. Specifically, for example, if the 2G/3G network downlink signal strength of the terminal is less than a tenth threshold, the 2G/3G network downlink signal-to-noise ratio of the terminal is less than an eleventh threshold, and/or the 2G/3G network downlink packet loss rate of the terminal is greater than a twelfth threshold, it may be considered that 2G/3G network downlink signal quality of the terminal cannot satisfy the voice service.

It may be understood that, a case of determining, based on both the 2G/3G network uplink signal quality parameter and the 2G/3G network downlink signal quality parameter of the terminal, whether the 2G/3G network signal quality of the terminal can satisfy a voice service may be deduced by analogy.

Optionally, in some possible implementation manners of the present disclosure, after the receiving, by an access network device, from a core network device, a bearer setup request message of a VoLTE service, the method may further include: sending, by the access network device, a second measurement control instruction to the terminal, where the second measurement control instruction is used to instruct the terminal to measure the 2G/3G network signal quality; and receiving, by the access network device, a second measurement report sent by the terminal in response to the second measurement control instruction, where the second measurement report carries a 2G/3G network downlink signal quality parameter of the terminal. That is, after the access network device receives, from the core network device, the bearer setup request message of the VoLTE service, the access network device may instruct the terminal to obtain the 2G/3G network downlink signal quality parameter of the terminal in real time, and may determine, according to the 2G/3G downlink signal quality parameter obtained by the terminal in real time, whether the 2G/3G network signal quality of the terminal can satisfy the voice service.

The following provides a description from a perspective of a core network device of a Long Term Evolution network.

A service processing method includes: sending, by a core network device of an LTE network, a bearer setup request message of a VoLTE service to an access network device of the Long Term Evolution network; and sending, by the core network device, a notification message to the access network device of the Long Term Evolution network, where the notification message carries indication information used to indicate that a terminal of the VoLTE service has registered with a circuit switched domain, and the notification message is used by the access network device to: when determining that signal quality of the terminal of the VoLTE service cannot satisfy the VoLTE service, before the bearer setup request message is rejected, determine that the terminal has registered with the circuit switched domain.

The following provides a description from a perspective of a called terminal.

Figure 2:
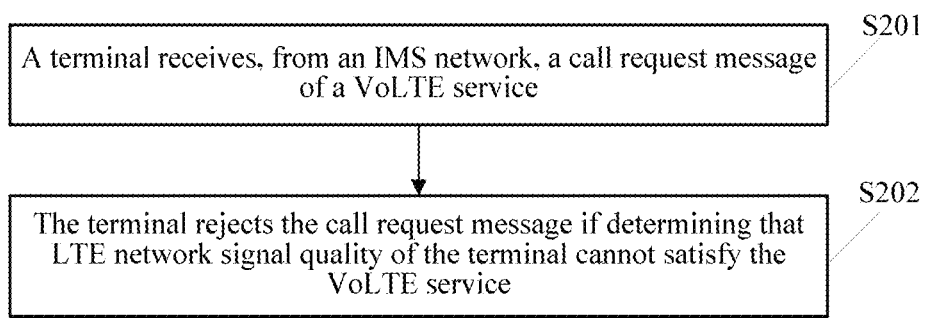
FIG. 2 is a schematic flowchart of another service processing method according to an illustrative embodiment of the present disclosure.

Referring to FIG. 2, FIG. 2 is a schematic flowchart of another service processing method according to another embodiment of the present disclosure. As shown in an example in FIG. 2, another service processing method provided in another embodiment of the present disclosure may include the following steps.

201: A terminal receives, from an IMS network, a call request message of a VoLTE service.

The call request message may be an invite message or another message that is used to establish a VoLTE service.

202: The terminal rejects the call request message if determining that LTE network signal quality of the terminal cannot satisfy the VoLTE service.

It may be understood that, that the LTE network signal quality of the terminal cannot satisfy the VoLTE service may specifically refer to: The LTE network signal quality of the terminal cannot satisfy a user plane bearer (for example, a bearer whose QCI=1) of the VoLTE service, that is, the LTE network signal quality of the terminal cannot meet an LTE network signal quality condition for (required by) a user plane bearer of the VoLTE service.

It may be learned that, in the technical solution of this embodiment, after a terminal receives, from an IMS network, a call request message of a VoLTE service, the terminal rejects the call request message if determining that LTE network signal quality of the terminal cannot satisfy the VoLTE service. That is, in a bearer setup process of the VoLTE service, if a called terminal finds that LTE network signal quality of the called terminal cannot satisfy the VoLTE service, the called terminal stops bearer setup of the VoLTE service, to help to some extent improve stability of an established VoLTE service, thereby improving call experience of a user. For example, currently, there are still many areas having weak LTE network coverage, and an operator is incapable of ensuring that LTE network signal quality of an LTE network of each area is good. For example, generally, cell-edge coverage of an LTE network is often relatively weak, and after the technical solution of this embodiment is used, because of the weak coverage of the LTE network cell edge, the terminal may be incapable of initiating setup of a VoLTE service in these areas, which further helps enable the terminal to establish a call service in another manner, and helps improve stability of the successfully established call service.

Optionally, the rejecting the call request message may include: sending, by the terminal, a response message for rejecting the call request message to the IMS network, where the response message is used in the IMS network to trigger the terminal to initiate a circuit switched fallback call.

Optionally, the response message may be, for example, a temporarily unavailable response message. Specifically, for example, the temporarily unavailable response message may be a 480 response message.

Optionally, the terminal may determine, based on an LTE network uplink signal quality parameter and/or an LTE network downlink signal quality parameter of the terminal, that the LTE network signal quality of the terminal cannot satisfy the VoLTE service.

Optionally, the LTE network uplink signal quality parameter of the terminal may include: at least one of an LTE network uplink signal strength of the terminal, an LTE network uplink signal-to-noise ratio of the terminal, or an LTE network uplink packet loss rate of the terminal. Specifically, for example, if the LTE network uplink signal strength of the terminal is less than a first threshold, the LTE network uplink signal-to-noise ratio of the terminal is less than a second threshold, and/or the LTE network uplink packet loss rate of the terminal is greater than a third threshold, it may be considered that LTE network uplink signal quality of the terminal cannot satisfy the VoLTE service.

Optionally, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal. Specifically, for example, if the LTE network downlink signal strength of the terminal is less than a fourth threshold, the LTE network downlink signal-to-noise ratio of the terminal is less than a fifth threshold, and/or the LTE network downlink packet loss rate of the terminal is greater than a sixth threshold, it may be considered that LTE network downlink signal quality of the terminal cannot satisfy the VoLTE service.

It may be understood that, a case of determining, based on both the LTE network uplink signal quality parameter and the LTE network downlink signal quality parameter of the terminal, whether the LTE network signal quality of the terminal can satisfy the VoLTE service may be deduced by analogy.

Optionally, after the terminal receives, from the IMS network, the call request message of the VoLTE service, the terminal may measure the LTE network downlink signal quality, to obtain the LTE network downlink signal quality parameter of the terminal. That is, after receiving, from the IMS network, the call request message of the VoLTE service, the terminal may obtain the LTE network downlink signal quality parameter of the terminal in real time, and may determine, according to the LTE network downlink signal quality parameter obtained by the terminal in real time, whether the LTE network signal quality of the terminal can satisfy the VoLTE service.

Optionally, after the terminal receives, from the IMS network, the call request message of the VoLTE service, the terminal obtains, from an access network device, the LTE network uplink signal quality parameter of the terminal. That is, after receiving, from the IMS network, the call request message of the VoLTE service, the terminal may obtain in real time the LTE network uplink signal quality parameter of the terminal from the access network device, and may determine, according to the obtained LTE network uplink signal quality parameter, whether the LTE network signal quality of the terminal can satisfy the VoLTE service.

The following provides a description from a perspective of a calling terminal.

Figure 3:
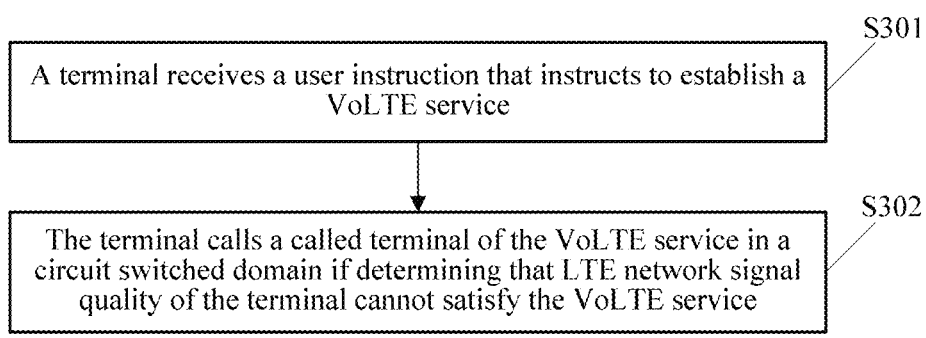
FIG. 3 is a schematic flowchart of another service processing method according to an illustrative embodiment of the present disclosure.

Referring to FIG. 3, FIG. 3 is a schematic flowchart of another service processing method according to another embodiment of the present disclosure. As shown in an example in FIG. 3, another service processing method provided in another embodiment of the present disclosure may include the following steps.

301: A terminal receives a user instruction that instructs to establish a VoLTE service.

For example, when a user of a terminal wants to make a call with another user based on the VoLTE service, the user may send the user instruction that instructs to establish a VoLTE service.

302: The terminal calls a called terminal of the VoLTE service in a circuit switched domain if determining that LTE network signal quality of the terminal cannot satisfy the VoLTE service.

Specifically, for example, if the terminal determines that the LTE network signal quality of the terminal cannot satisfy the VoLTE service, the terminal initiates a CSFB procedure to fall back to the circuit switched domain, and calls the called terminal of the VoLTE service in the circuit switched domain.

It may be learned that, in the technical solution of this embodiment, after a terminal receives a user instruction that instructs to establish a VoLTE service, the terminal calls a called terminal of the VoLTE service in a circuit switched domain if determining that LTE network signal quality of the terminal cannot satisfy the VoLTE service, that is, before preparing to set up a bearer of the VoLTE service, if a calling terminal finds that LTE network signal quality of the calling terminal cannot satisfy the VoLTE service, the calling terminal stops bearer setup of the VoLTE service, and directly changes to establish a circuit switched domain connection, to help to some extent improve stability of an established call service, thereby improving call experience of a user. For example, currently, there are still many areas having weak LTE network coverage, and an operator is incapable of ensuring that signal quality of an LTE network of each area is good. For example, generally, cell-edge coverage of an LTE network is often relatively weak, and after the technical solutions of this embodiment are used, because of the weak coverage of the LTE network cell edge, the terminal may be incapable of initiating setup of a VoLTE service in these areas, which further helps enable the terminal to establish a call service in another manner, and helps improve stability of the successfully established call service.

Optionally, the terminal may determine, based on an LTE network uplink signal quality parameter and/or an LTE network downlink signal quality parameter of the terminal, that the LTE network signal quality of the terminal cannot satisfy the VoLTE service.

Optionally, the LTE network uplink signal quality parameter of the terminal may include: at least one of an LTE network uplink signal strength of the terminal, an LTE network uplink signal-to-noise ratio of the terminal, or an LTE network uplink packet loss rate of the terminal. Specifically, for example, if the LTE network uplink signal strength of the terminal is less than a first threshold, the LTE network uplink signal-to-noise ratio of the terminal is less than a second threshold, and/or the LTE network uplink packet loss rate of the terminal is greater than a third threshold, it may be considered that LTE network uplink signal quality of the terminal cannot satisfy the VoLTE service.

Optionally, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal. Specifically, for example, if the LTE network downlink signal strength of the terminal is less than a fourth threshold, the LTE network downlink signal-to-noise ratio of the terminal is less than a fifth threshold, and/or the LTE network downlink packet loss rate of the terminal is greater than a sixth threshold, it may be considered that LTE network downlink signal quality of the terminal cannot satisfy the VoLTE service.

It may be understood that, a case of determining, based on both the LTE network uplink signal quality parameter and the LTE network downlink signal quality parameter of the terminal, whether the LTE network signal quality of the terminal can satisfy the VoLTE service may be deduced by analogy.

Optionally, after the terminal receives the user instruction that instructs to establish a VoLTE service, the terminal may measure the LTE network downlink signal quality, to obtain the LTE network downlink signal quality parameter of the terminal. That is, after receiving the user instruction that instructs to establish a VoLTE service, the terminal may obtain the LTE network downlink signal quality parameter of the terminal in real time, and may determine, according to the LTE network downlink signal quality parameter obtained by the terminal in real time, whether the LTE network signal quality of the terminal can satisfy the VoLTE service.

Optionally, after the terminal receives the user instruction that instructs to establish a VoLTE service, the terminal obtains, from an access network device, the LTE network uplink signal quality parameter of the terminal. That is, after receiving the user instruction that instructs to establish a VoLTE service, the terminal may obtain in real time the LTE network uplink signal quality parameter of the terminal from the access network device, and may determine, according to the obtained LTE network uplink signal quality parameter, whether the signal quality of the terminal can satisfy the VoLTE service.

Optionally, in some possible implementation manners of the present disclosure, before the calling a called terminal of the VoLTE service in a circuit switched domain, the method further includes: determining, by the terminal, that the terminal has registered with the circuit switched domain.

Optionally, in some possible implementation manners of the present disclosure, before the calling a called terminal of the VoLTE service in a circuit switched domain, the method further includes: registering, by the terminal, with the circuit switched domain when the terminal has not registered with the circuit switched domain.

Optionally, in some possible implementation manners of the present disclosure, the registering, by the terminal, with the circuit switched domain includes: registering, by the terminal, with the circuit switched domain in a combined attach manner, or camping, by the terminal, on the circuit switched domain by means of a reselection process, and registering with the circuit switched domain.

That is, the terminal may call the called terminal of the VoLTE service in the circuit switched domain only when determining that the terminal has registered with the circuit switched domain, and when the terminal determines that the terminal has not registered with the circuit switched domain, the terminal may not call the called terminal of the VoLTE service in the circuit switched domain.

Optionally, in some possible implementation manners of the present disclosure, before the calling a called terminal of the VoLTE service in a circuit switched domain, the method further includes: determining, by the terminal, that network signal quality of the circuit switched domain satisfies a voice service. That is, the terminal may call the called terminal of the VoLTE service in the circuit switched domain only when the network signal quality of the circuit switched domain satisfies the voice service, and when the terminal determines that the network signal quality of the circuit switched domain cannot satisfy the voice service, the terminal may not call the called terminal of the VoLTE service in the circuit switched domain.

Optionally, in some possible implementation manners of the present disclosure, before the calling, by the terminal, a called terminal of the VoLTE service in a circuit switched domain if determining that signal quality of the terminal cannot satisfy the VoLTE service, the method may further include: receiving, by the terminal, a notification message from the Long Term Evolution network, where the notification message carries a Long Term Evolution network uplink signal quality parameter and/or a Long Term Evolution network downlink signal quality parameter of the terminal, and the notification message is used by the terminal to determine that the Long Term Evolution network signal quality of the terminal cannot satisfy the VoLTE service. For example, the notification message is from an access network device of the Long Term Evolution network.

To better understand and implement the foregoing technical solutions of the embodiments of the present disclosure, the following provides a detailed description with reference to some specific application scenarios.

Figure 4:
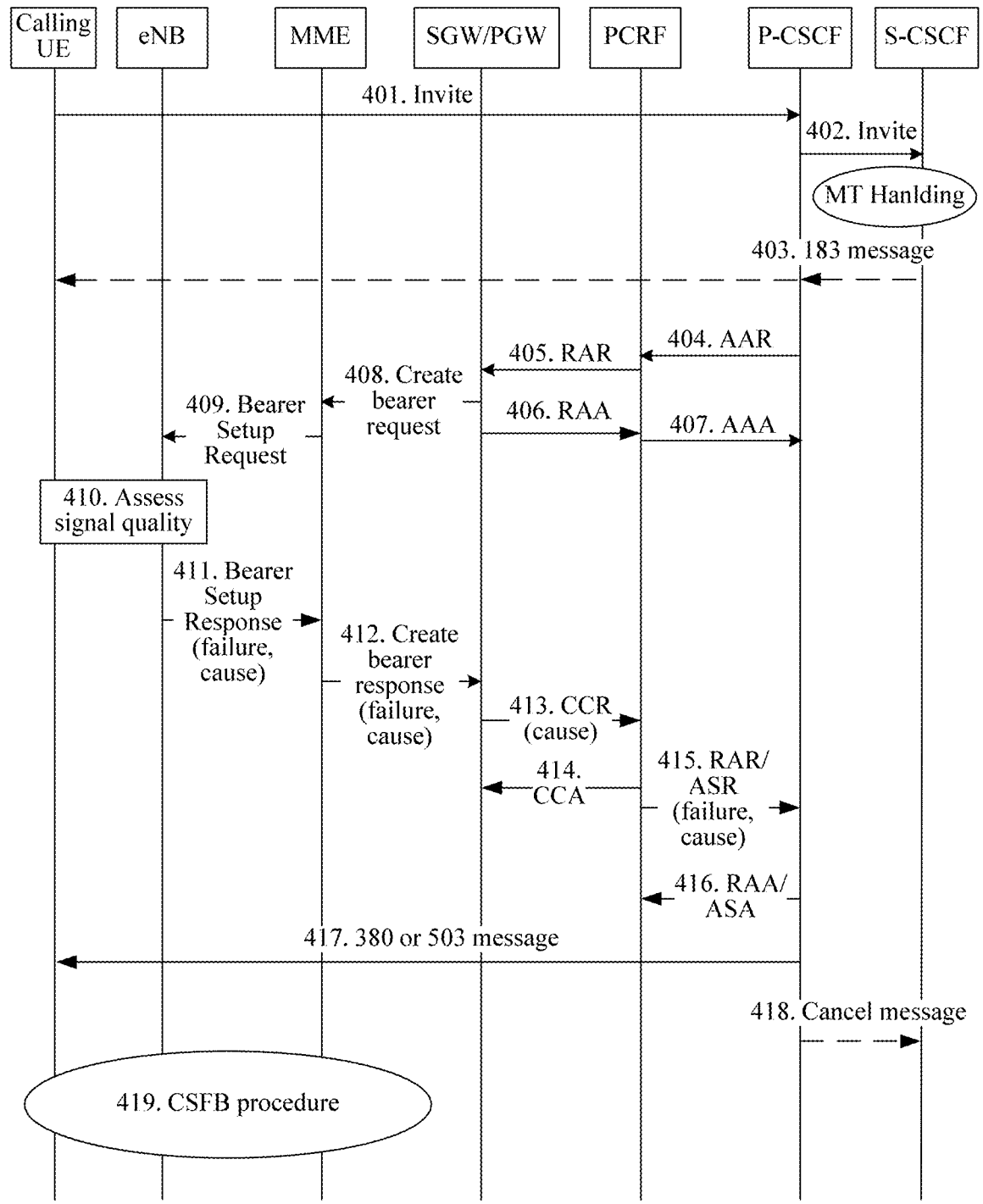
FIG. 4 is a schematic flowchart of another service processing method according to an illustrative embodiment of the present disclosure.

Referring to FIG. 4, FIG. 4 is a schematic flowchart of another service processing method according to another embodiment of the present disclosure. As shown in an example in FIG. 4, another service processing method provided in another embodiment of the present disclosure may include the following steps.

S401: Calling UE initiates setup of a VoLTE service by sending an invite message.

S402: A calling-party P-CSCF receives the invite message from the calling UE, where the received invite message triggers the calling-party P-CSCF to establish an IMS calling session for the calling UE; the calling-party P-CSCF sends the invite message to a subsequent IMS node (for example, an IMS node such as an S-CSCF or an SCC AS).

The subsequent IMS node starts to process the received invite message, and called UE may receive the invite message forwarded by a network side.

S403: If the calling-party P-CSCF receives a 183 response message sent by a calling-party S-CSCF, the calling-party P-CSCF may forward the 183 response message to the calling UE.

S404: The calling-party P-CSCF sends an authentication authorization request to a PCRF to trigger setup of a dedicated bearer of the VoLTE service. Certainly, the calling-party P-CSCF may trigger setup of the dedicated bearer of the VoLTE service before receiving the 183 response message, that is, the calling-party P-CSCF triggers a setup procedure of the dedicated bearer of the VoLTE service when receiving the invite message.

The authentication authorization request (AAR) may carry a user identifier of the calling UE, an IMS application layer charging identifier, media description information, and the like. The media description information may include at least one of the following information: a classifier identifier, bandwidth requirement description information, media type description information, or a QoS parameter.

S405: The PCRF receives the AAR.

The PCRF may send, according to the media description information carried in the AAR, a re-authentication request (RAR) that carries QoS rules to a PGW, to trigger the PGW to set up a user plane data dedicated bearer of the VoLTE service. Generally, a quality of service class identifier (QCI) of the user plane data dedicated bearer of the VoLTE service is equal to 1.

The QoS rules include a QoS key parameter.

The QoS key parameter may include a guaranteed bit rate (GBR), an allocation/retention priority (ARP), a quality of service class identifier (QCI), a maximum bit rate (MBR), and/or the like.

S406: A PGW receives an RAR message from the PCRF, and the PGW sends, to the PCRF, a re-authentication answer (RAA) message used to respond to the RAR request.

S407: The PCRF entity receives the RAA message from the PGW, and after receiving the RAA message, the PCRF sends an authentication authorization answer (AAA) message to the calling-party P-CSCF.

S408: After the PGW receives the RAR request sent by the PCRF entity, when the PGW triggers setup of a dedicated bearer whose QCI=1 according to the QoS parameter carried in the RAR message, the PGW may send a create bearer request message to an SGW.

The SGW receives the create bearer request message from the PGW, and the SGW sends a create bearer request message to an MME according to the received create bearer request message.

S409: An MME sends a bearer setup request message to an eNB to request the eNB to allocate a corresponding air interface resource and a corresponding S1 interface resource to the dedicated bearer whose QCI=1.

S410: The eNB receives the bearer setup request message sent by the MME, and determines that setup of the user plane data dedicated bearer of the VoLTE service, specifically, the dedicated bearer whose QCI=1, is requested.

The eNB determines whether current LTE network signal quality of the calling UE can meet a signal quality condition for setting up the dedicated bearer whose QCI=1.

For example, that the eNB determines whether the current LTE network signal quality of the calling UE can meet the signal quality condition for setting up the dedicated bearer whose QCI=1 may include: determining, based on an LTE network signal quality parameter of the calling UE, whether the current LTE network signal quality of the calling UE can meet the signal quality condition for setting up the dedicated bearer whose QCI=1. The LTE network signal quality parameter of the calling UE includes: an LTE network uplink signal quality parameter of the calling UE and an LTE network downlink signal quality parameter of the calling UE.

Optionally, the LTE network uplink signal quality parameter of the calling UE includes: an LTE network uplink signal strength of the calling UE, an LTE network uplink signal-to-noise ratio of the calling UE, an LTE network uplink packet loss rate of the calling UE, and/or the like.

Optionally, the LTE network downlink signal quality parameter of the calling UE includes: an LTE network downlink signal strength of the calling UE, an LTE network downlink signal-to-noise ratio of the calling UE, an LTE network downlink packet loss rate of the calling UE, and/or the like.

Specifically, for example, after the eNB receives the bearer setup request message sent by the MME, the eNB may send a measurement control instruction to the calling UE, and receive a measurement report sent by the calling UE in response to the measurement control instruction, where the measurement report carries the LTE network downlink signal quality parameter of the calling UE.

In this embodiment, a case in which the eNB determines that the current LTE network signal quality of the calling UE cannot meet the signal quality condition for setting up the dedicated bearer whose QCI=1 is mainly used as an example.

S411: If the eNB determines that current LTE network signal quality of the calling UE cannot meet a signal quality condition for setting up the dedicated bearer whose QCI=1, the eNB may reject the bearer setup request message, and the eNB may return a bearer setup response message to the MME.

The bearer setup response message may carry an indication information element used to indicate a setup failure of the bearer whose QCI=1, and carry a cause value of the bearer setup failure.

The cause value may specifically be: Radio resources not available, Failure in the Radio Interface Procedure, or Not supported QCI value, and the cause value may be a cause value not defined in a standard, and this is not limited herein.

Optionally, before the eNB rejects the bearer setup request message, the eNB may further determine that 2G/3G network signal quality of the calling UE of the VoLTE service satisfies a voice service. For example, the eNB sends a second measurement control instruction to the calling UE, where the second measurement control instruction is used to instruct the calling UE to measure the 2G/3G network signal quality; and the eNB receives a second measurement report sent by the calling UE in response to the second measurement control instruction, where the second measurement report carries a 2G/3G network downlink signal quality parameter of the calling UE. The eNB determines, for example, based on the second measurement report, whether the current LTE network signal quality of the calling UE can satisfy the voice service.

Optionally, before the eNB rejects the bearer setup request message, the eNB may further first determine that a terminal of the VoLTE service has registered with a circuit switched domain. For example, before rejecting the bearer setup request message, the eNB may receive a notification message from the MME, where the notification message carries indication information used to indicate that the calling UE has registered with the circuit switched domain.

Specifically, for example, the notification message may be specifically a downlink non-access stratum transport message (DOWNLINK NAS TRANSPORT), an initial context setup request message (INITIAL CONTEXT SETUP REQUEST), or a UE context modification request message (UE CONTEXT MODIFICATION REQUEST). Alternatively, the bearer setup request message sent by the MME and received by the eNB carries indication information used to indicate that the terminal has registered with the circuit switched domain.

S412: The MME sends a create bearer response message to the SGW.

The bearer setup response message carries a cause value for rejection of bearer setup, and the cause value carried in the MME may be set with reference to the cause value obtained from the eNB.

S413: The SGW receives the create bearer response message from the MME, and the SGW sends a create bearer response message to the PGW according to the received create bearer response message.

The PGW sends a credit control request (CCR message to the PCRF entity, where the CCR message carries an indication used to indicate a setup failure of the dedicated bearer whose QCI=1, and carries a cause value of the setup failure of the dedicated bearer, where the cause value is specifically set with reference to the cause value carried in the create bearer response message.

S414: The PCRF entity sends a credit control answer (CCA) message to the PGW.

S415: The PCRF entity sends a re-authentication request (RAR) message/abort-session-request (ASR) message to the calling-party P-CSCF according to the CCR message, where the RAR message/ASR message may carry indication information used to indicate that bearer resources are insufficient or indication information used to indicate a resource allocation failure.

S416: The calling-party P-CSCF sends a re-authentication answer (RAA) message/abort-session-answer (ASA) message to the PCRF entity.

S417: After acquiring the indication information used to indicate that bearer resources are insufficient or the indication information used to indicate a resource allocation failure, the calling-party P-CSCF sends a 380 response message or a 503 response message to the calling UE.

Optionally, after acquiring the indication information used to indicate that bearer resources are insufficient or the indication information used to indicate a resource allocation failure, P-CSCFs of operators send different response messages. To resolve VoLTE roaming, the P-CSCFs may deliver different response messages according to whether the calling UE is a roaming subscriber, for example, send the 380 message with respect to an operator A, and send the 503 message with respect to an operator B.

Further, if it is defined in a standard that sending of a first response message such as the 380 response message is recommended in this scenario, after the P-CSCF obtains the indication information used to indicate that bearer resources are insufficient or the indication information used to indicate a resource allocation failure, the P-CSCF determines that the VoLTE user is a roaming subscriber, and the P-CSCF may send the first response message.

To sum up, if the P-CSCF determines that the VoLTE user is a roaming subscriber, the P-CSCF may send the first response message according to a PLMN to which the roaming subscriber belongs. Optionally, the P-CSCF sends a second response message to all roaming subscribers uniformly. If the P-CSCF determines that the VoLTE user is not a roaming subscriber, the P-CSCF sends a third response message according to a configuration.

In addition, optionally, if a VoLTE call fails, an IMS network instructs, according to different causes, the UE to initiate a call in a 2/3G circuit switched domain or continue to remain in an LTE network or a WiFi network to initiate a VoWiFi call or continue to initiate a call in the LTE network.

Specifically, for example:

1) after the P-CSCF obtains, from the PCRF, the indication information used to indicate that bearer resources are insufficient or the indication information used to indicate a resource allocation failure, the P-CSCF sends a third response message, to instruct the UE to initiate a call in the 2/3G circuit switched domain;

2) after the P-CSCF obtains, from the PCRF, the indication information used to indicate that bearer resources are insufficient or the indication information used to indicate a resource allocation failure, the P-CSCF sends a fourth response message, to instruct the UE to initiate a VoWiFi call in the WiFi network; and 3) a VoLTE call fails because a congestion occurs in the P-CSCF, and the P-CSCF sends a fifth response message, to instruct the UE to continue to initiate a call in the LTE network.

Further, the fifth response message instructs the UE to use different P-CSCFs to initiate calls.

S418: If the calling-party P-CSCF has received the 183 response message, the calling-party P-CSCF may send a cancel message to a device such as the calling-party S-CSCF, to cancel a VoLTE service-related call that has been requested.

If the calling-party P-CSCF does not receive the 183 response message, the calling-party P-CSCF may send the cancel message to the called UE without a device such as the calling-party S-CSCF.

S419: After receiving the 380 or 503 message sent by the calling-party P-CSCF, the calling UE may perform calling domain reselection and initiate a CSFB call. A UE side and a network side cooperatively execute a CSFB procedure, and finally may establish a voice call in a CS domain.

In the foregoing process, the ENB directly rejects the bearer setup request when determining that the current LTE network signal quality of the calling UE does not meet a requirement of the bearer whose QCI=1, thereby transferring a VoLTE call into a CSFB call. However, in another embodiment of the present disclosure, when determining that the current LTE signal quality does not meet the requirement of the bearer whose QCI=1, the ENB may accept the bearer setup request so as to establish a VoLTE call successfully. However, subsequently, the ENB transmits data on the bearer whose QCI=1 according to the current LTE signal quality of the UE by using a lower coding scheme, for example, reduces corresponding original 128 QAM to 64 QAM.

After the technical solution of this embodiment is used, it is ensured that when the calling UE is located in a weak LTE coverage area (for example, weak LTE indoor coverage) that cannot meet a signal quality requirement of a VoLTE service, a CSFB call can be used in a calling voice session creation phase to replace a VoLTE service call, to avoid a technical problem such as a call loss, poor session quality, or a large call establish delay caused by creating a VoLTE service call as much as possible.

In addition, the VoLTE service call may be free from control of an assessment result of eNB signal quality, and instead, a VoLTE call control switch of a cell level is provided according to a policy of an operator. That is, for some particular LTE cells, the operator does not allow setup of a VoLTE, for example, if a request sent by the MME to set up the bearer whose QCI=1 is received, the eNB directly rejects the bearer setup request.

Figure 5:
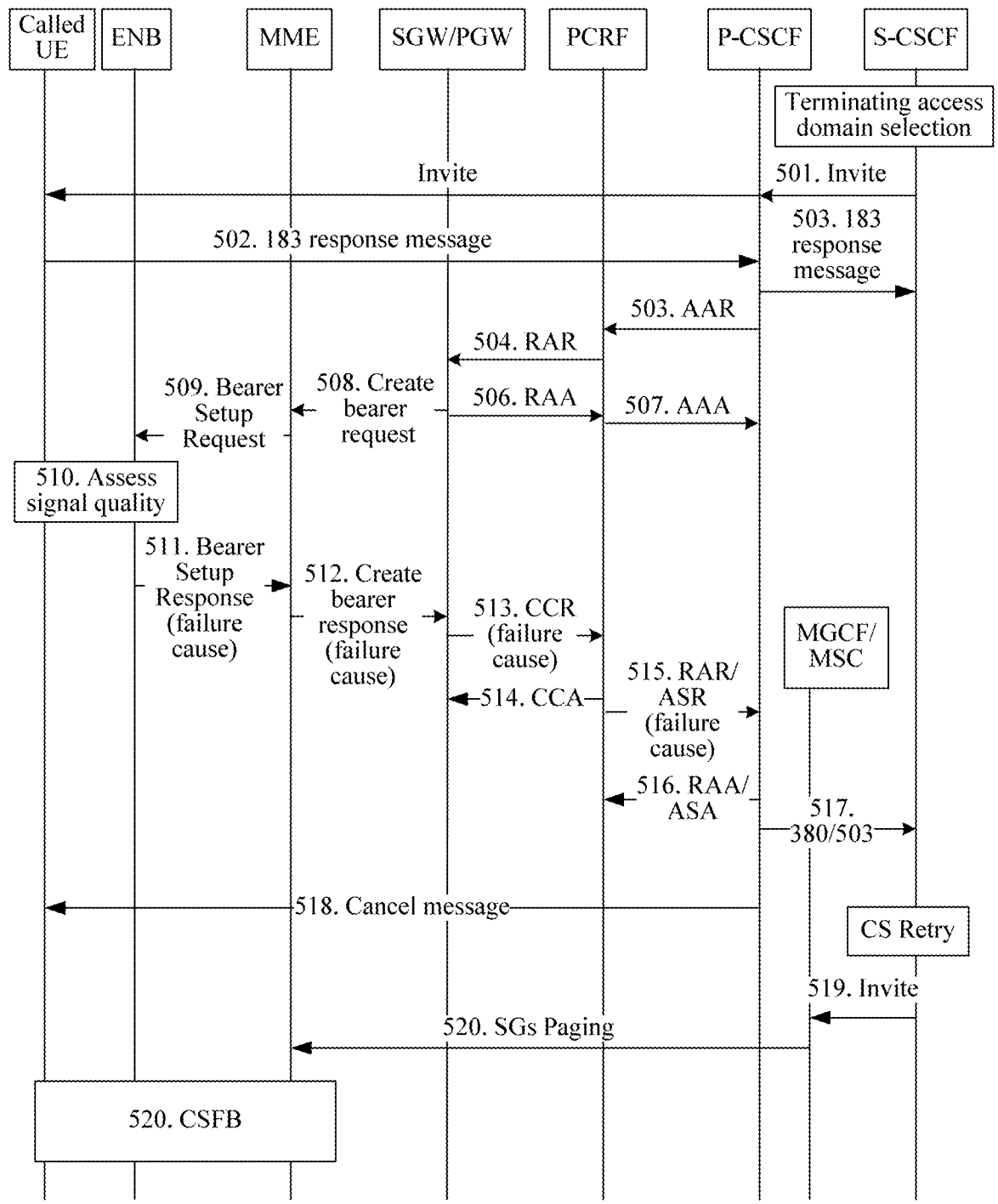
FIG. 5 is a schematic flowchart of another service processing method according to an illustrative embodiment of the present disclosure.

Referring to FIG. 5, FIG. 5 is a schematic flowchart of another service processing method according to another embodiment of the present disclosure. As shown in an example in FIG. 5, another service processing method provided in another embodiment of the present disclosure may include the following steps.

S501: A called-party P-CSCF receives an invite message sent by a called-party S-CSCF, where the received invite message may trigger the called-party P-CSCF to establish an IMS called session for called UE; the called-party P-CSCF continues to send the invite message to the called UE.

S502: After receiving the invite message, the called UE returns a 183 response message to the called-party P-CSCF.

S503: If the called-party P-CSCF receives the 183 response message, the called-party P-CSCF sends the 183 response message to the called-party S-CSCF, the called-party S-CSCF may further send the 183 response message to a calling-party S-CSCF, the calling-party S-CSCF further sends the 183 response message to a calling-party P-CSCF, and if the calling-party P-CSCF receives the 183 response message sent by the calling-party S-CSCF, the calling-party P-CSCF may forward the 183 response message to calling UE.

S504: The called-party P-CSCF sends an authentication authorization request to a PCRF to trigger setup of a dedicated bearer of a VoLTE service. Certainly, the called-party P-CSCF may trigger setup of the dedicated bearer of the VoLTE service before receiving the 183 response message, that is, the called-party P-CSCF triggers a setup procedure of the dedicated bearer of the VoLTE service when receiving the invite message.

The authentication authorization request (AAR) may carry a user identifier of the called UE, an IMS application layer charging identifier, media description information, and the like. The media description information may include at least one of the following information: a classifier identifier, bandwidth requirement description information, media type description information, or a QoS parameter.

S505: The PCRF receives the AAR, and the PCRF sends, according to the media description information carried in the AAR, a re-authentication request (RAR, Re-authentication Request) that carries QoS rules to a PGW, to trigger the PGW to set up a user plane data dedicated bearer of the VoLTE service. Generally, a quality of service class identifier (QCI) of the user plane data dedicated bearer of the VoLTE service is equal to 1.

The QoS rules include a QoS key parameter.

The QoS key parameter may include a guaranteed bit rate (GBR), an allocation/retention priority (ARP), a quality of service class identifier (QCI), a maximum bit rate (MBR), and/or the like.

S506: The PGW receives the RAR message from the PCRF, and the PGW sends, to the PCRF, a re-authentication answer (RAA) message used to respond to the RAR request.

S507: The PCRF entity receives the RAA message from the PGW, and after receiving the RAA message, the PCRF sends an authentication authorization answer (AAA) message to the called-party P-CSCF.

S508: After the PGW receives the RAR request sent by the PCRF entity, when the PGW triggers setup of a dedicated bearer whose QCI=1 according to a QoS parameter carried in the RAR message, the PGW may send a create bearer request message to an SGW.

The SGW receives the create bearer request message from the PGW, and the SGW sends a create bearer request message to an MME according to the received create bearer request message.

S509: The MME sends a bearer setup request message to an eNB to request the eNB to allocate a corresponding air interface resource and a corresponding S1 interface resource to the dedicated bearer whose QCI=1.

S510: The eNB receives the bearer setup request message sent by the MME, and determines that setup of the user plane data dedicated bearer of the VoLTE service, specifically, the dedicated bearer whose QCI=1, is requested.

The eNB determines whether current LTE network signal quality of the called UE can meet a signal quality condition for setting up the dedicated bearer whose QCI=1.

For example, that the eNB determines whether the current LTE network signal quality of the called UE can meet the signal quality condition for setting up the dedicated bearer whose QCI=1 may include: determining, based on an LTE network signal quality parameter of the called UE, whether the current LTE network signal quality of the called UE can meet the signal quality condition for setting up the dedicated bearer whose QCI=1. The LTE network signal quality parameter of the called UE includes: an LTE network uplink signal quality parameter of the called UE and an LTE network downlink signal quality parameter of the called UE.

Optionally, the LTE network uplink signal quality parameter of the called UE includes: an LTE network uplink signal strength of the called UE, an LTE network uplink signal-to-noise ratio of the called UE, an LTE network uplink packet loss rate of the called UE, and/or the like.

Optionally, the LTE network downlink signal quality parameter of the called UE includes: an LTE network downlink signal strength of the called UE, an LTE network downlink signal-to-noise ratio of the called UE, an LTE network downlink packet loss rate of the called UE, and/or the like.

Specifically, for example, after the eNB receives the bearer setup request message sent by the MME, the eNB may send a measurement control instruction to the called UE, and receive a measurement report sent by the called UE in response to the measurement control instruction, where the measurement report carries the LTE network downlink signal quality parameter of the called UE.

In this embodiment, a case in which the eNB determines that the current LTE network signal quality of the called UE cannot meet the signal quality condition for setting up the dedicated bearer whose QCI=1 is mainly used as an example.

S511: If the eNB determines that the current LTE network signal quality of the called UE cannot meet the signal quality condition for setting up the dedicated bearer whose QCI=1, the eNB may reject the bearer setup request message, and the eNB may return a bearer setup response message to the MME.

The bearer setup response message may carry an indication information element used to indicate a setup failure of the bearer whose QCI=1, and carry a cause value of the bearer setup failure.

The cause value may specifically be: Radio resources not available, Failure in the Radio Interface Procedure, or Not supported QCI value, and the cause value may be a cause value not defined in a standard, and this is not limited herein.

Optionally, before the eNB rejects the bearer setup request message, the eNB may further determine that 2G/3G network signal quality of the called UE of the VoLTE service satisfies a voice service. For example, the eNB sends a second measurement control instruction to the called UE, where the second measurement control instruction is used to instruct the called UE to measure the 2G/3G network signal quality; and the eNB receives a second measurement report sent by the called UE in response to the second measurement control instruction, where the second measurement report carries a 2G/3G network downlink signal quality parameter of the called UE. The eNB determines, for example, based on the second measurement report, whether the current LTE network signal quality of the called UE can satisfy the voice service.

Optionally, before the eNB rejects the bearer setup request message, the eNB may further first determine that a terminal of the VoLTE service has registered with a circuit switched domain. For example, before rejecting the bearer setup request message, the eNB may receive a notification message from the MME, where the notification message carries indication information used to indicate that the called UE has registered with the circuit switched domain.

Specifically, for example, the notification message may be specifically a downlink non-access stratum transport message (DOWNLINK NAS TRANSPORT), an initial context setup request message (INITIAL CONTEXT SETUP REQUEST), or a UE context modification request message (UE CONTEXT MODIFICATION REQUEST). Alternatively, the bearer setup request message sent by the MME and received by the eNB carries indication information used to indicate that the terminal has registered with the circuit switched domain.

S512: The MME sends a create bearer response message to the SGW.

The bearer setup response message carries a cause value for rejection of bearer setup, and the cause value carried in the MME may be set with reference to the cause value obtained from the eNB.

S513: The SGW receives the create bearer response message from the MME, and the SGW sends a create bearer response message to the PGW according to the received create bearer response message.

The PGW sends a credit control request (CCR) message to the PCRF entity, where the CCR message carries an indication used to indicate a setup failure of the dedicated bearer whose QCI=1, and carries a cause value of the setup failure of the dedicated bearer, where the cause value is specifically set with reference to the cause value carried in the create bearer response message.

S514: The PCRF entity sends a credit control answer (CCA) message to the PGW.

S515: The PCRF entity sends an RAR message/abort-session-request (ASR) message to the called-party P-CSCF according to the CCR message, where the RAR message/ASR message may carry indication information used to indicate that bearer resources are insufficient or indication information used to indicate a resource allocation failure.

S516: The called-party P-CSCF sends an RAA message/ASA message to the PCRF entity.

S517: After acquiring the indication information used to indicate that bearer resources are insufficient or the indication information used to indicate a resource allocation failure, the called-party P-CSCF sends a 380 or 503 response message to a terminating access domain selection in an IMS network by using the called-party S-CSCF.

S518: After acquiring the indication information used to indicate that bearer resources are insufficient or the indication information used to indicate a resource allocation failure, the called-party P-CSCF sends a cancel message to the called UE, so as to cancel a VoLTE service-related session that has been requested. No sequence is limited between step S518 and step S519.

S519: The terminating access domain selection in the IMS network reselects a CS domain for the called session, and initiates a call to a CS domain call control device (for example, an MSC) by using a device such as the called-party S-CSCF.

S520: The CS domain call control device (for example, an MSC) initiates a call to the MME by using an SGs interface.

S521: The MME triggers a CSFB procedure of the called UE. For details of a specific process, refer to related description in the 3GPP TS 23.272. Details are not described herein again. By using the CSFB procedure of the called UE, the called UE may finally establish a voice session in the CS domain.

After the technical solution of this embodiment is used, it is ensured that when the called UE is located in a weak LTE coverage area (for example, weak LTE indoor coverage) that cannot meet a signal quality requirement of a VoLTE service, a CSFB call can be used in a called voice session creation phase to replace a VoLTE service call, to avoid a technical problem such as a call loss, poor session quality, or a large call establish delay caused by creating a VoLTE service call as much as possible.

In addition, the VoLTE service call may be free from control of an assessment result of eNB signal quality, and instead, a VoLTE call control switch of a cell level is provided according to a policy of an operator. That is, for some particular LTE cells, the operator does not allow setup of a VoLTE, for example, if a request sent by the MME to set up the bearer whose QCI=1 is received, the eNB directly rejects the bearer setup request.

Figure 6:
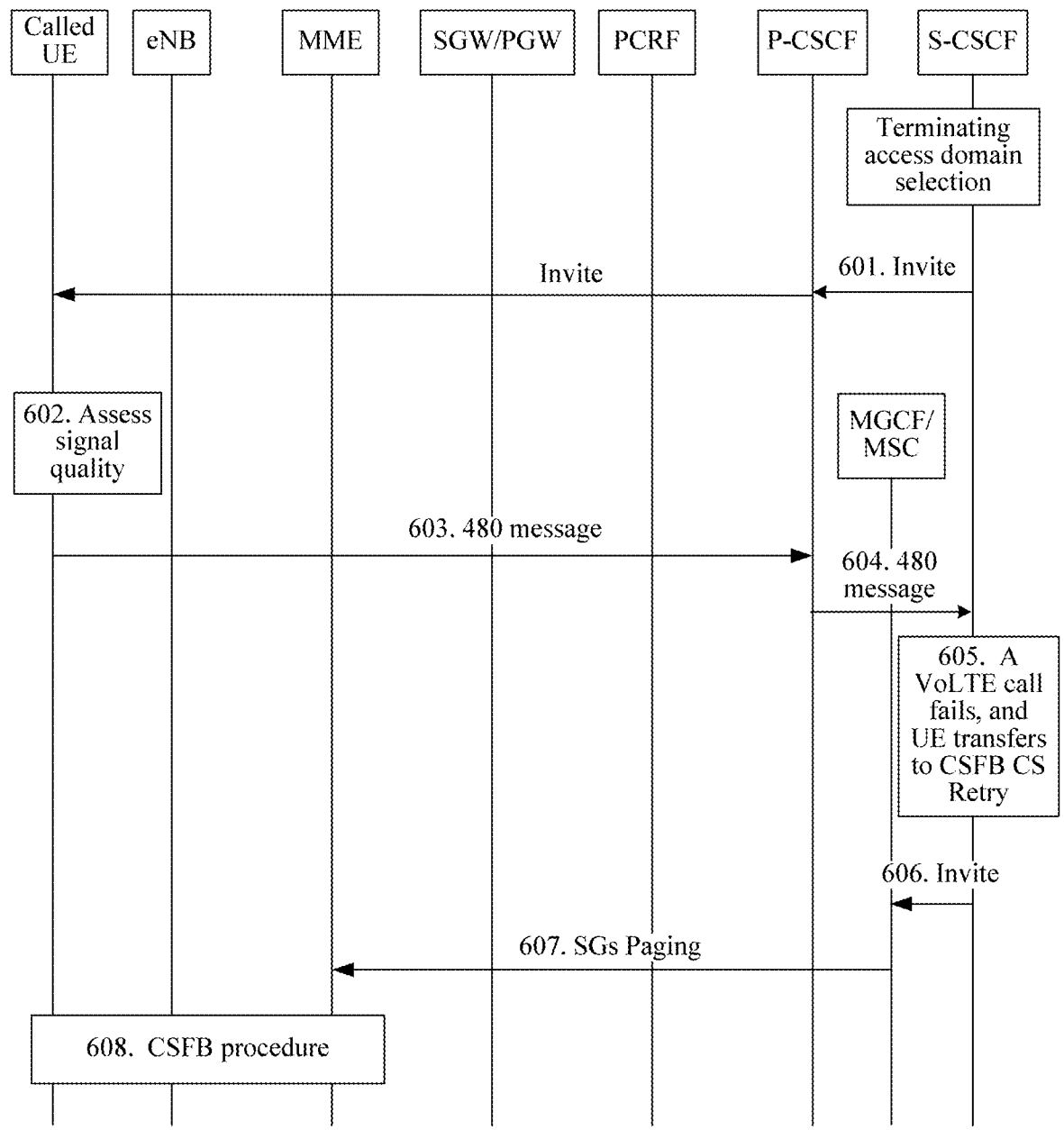
FIG. 6 is a schematic flowchart of another service processing method according to an illustrative embodiment of the present disclosure.

Referring to FIG. 6, FIG. 6 is a schematic flowchart of another service processing method according to another embodiment of the present disclosure. As shown in an example in FIG. 6, another service processing method provided in another embodiment of the present disclosure may include the following steps.

S601: After receiving an invite message, a called-party P-CSCF creates an IMS called session, and sends the invite message to called UE.

S602: The called UE receives the invite message.

The called UE does not establish a VoLTE voice session immediately after receiving the invite message, and instead, first determines whether current Long Term Evolution network signal quality of the called UE meets a signal quality condition for a bearer (a bearer whose QCI=1) of a VoLTE service.

For example, the called UE may determine, based on a Long Term Evolution network signal quality parameter of the called UE, that the current Long Term Evolution network signal quality of the called UE cannot meet the signal quality condition for the bearer of the VoLTE service, where the Long Term Evolution network signal quality parameter of the called UE includes: a Long Term Evolution network uplink signal quality parameter of the called UE and/or a Long Term Evolution network downlink signal quality parameter of the called UE.

Optionally, the Long Term Evolution network uplink signal quality parameter of the called UE includes: a Long Term Evolution network uplink signal strength of the called UE, a Long Term Evolution network uplink signal-to-noise ratio of the called UE, and/or a Long Term Evolution network uplink packet loss rate of the called UE.

Optionally, the Long Term Evolution network downlink signal quality parameter of the called UE includes: a Long Term Evolution network downlink signal strength of the called UE, a Long Term Evolution network downlink signal-to-noise ratio of the called UE, and/or a Long Term Evolution network downlink packet loss rate of the called UE.

Optionally, after receiving the invite message, the called UE may measure Long Term Evolution network downlink signal quality, to obtain the Long Term Evolution network downlink signal quality parameter of the called UE.

S603: If it is obtained by means of assessment that the current LTE signal quality of the called UE does not meet a VoLTE voice session requirement, the called UE returns a 480 response message to the called P-CSCF, where the 480 response message is used to indicate that the current VoLTE service is unavailable.

S604: After receiving the 480 response message, the called P-CSCF sends the 480 response message to an IMS domain selection service device by using an S-CSCF.

S605: After acquiring the 480 response message that indicates that the VoLTE service is unavailable, the domain selection service device of the IMS network reselects a CS domain for the voice called session.

S606: The IMS domain selection service device initiates a call to a CS domain call control device (for example, an MSC) by using a device such as a called S-CSCF.

S607: The CS domain call control device (for example, an MSC) initiates a call to the MME by using an SGs interface.

S608: The MME triggers a CSFB procedure of the called UE. For details of a specific process, refer to related description in the 3GPP TS 23.272. Details are not described herein again. By using the CSFB procedure of the called UE, the called UE may finally establish a voice session in the CS domain.

It may be learned that, in the technical solution of this embodiment, after called UE receives, from an IMS network, a call request message of a VoLTE service, the called UE rejects the call request message if determining that signal quality of the called UE cannot satisfy the VoLTE service. That is, in a bearer setup process of the VoLTE service, if the called UE finds that the signal quality of the called UE cannot satisfy the VoLTE service, the called UE stops bearer setup of the VoLTE service, to help to some extent improve stability of a established VoLTE service, thereby improving call experience of a user. For example, currently, there are still many areas having weak LTE network coverage, and an operator is incapable of ensuring that signal quality of an LTE network of each area is good. For example, generally, cell-edge coverage of an LTE network is often relatively weak, and after the technical solutions of this embodiment are used, because of the weak coverage of the LTE network cell edge, the called UE may be incapable of initiating setup of a VoLTE service in these areas, this helps enable the called UE to establish a CS domain call service in another manner, and helps improve stability of the successfully established call service.

Figure 7:
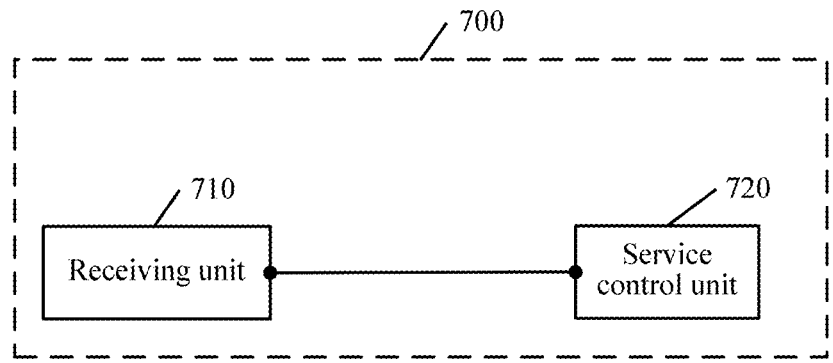
FIG. 7 is a schematic diagram of an access network device according to an illustrative embodiment of the present disclosure.

Referring to FIG. 7, an embodiment of the present disclosure provides an access network device 700, which may include:

a receiving unit 710, configured to receive, from a core network device, a bearer setup request message of a VoLTE service; and a service control unit 720, configured to reject the bearer setup request message if determining that LTE network signal quality of a terminal of the VoLTE service cannot satisfy the VoLTE service.

Optionally, in some possible implementation manners of the present disclosure, the service control unit 720 is specifically configured to: if determining that the LTE network signal quality of the terminal of the VoLTE service cannot satisfy the VoLTE service, send a response message for rejecting the bearer setup request message to the core network device, where the response message is used by the core network device to trigger the terminal to initiate a circuit switched fallback call.

Optionally, in some possible implementation manners of the present disclosure, the response message carries a cause value for a bearer setup failure of the VoLTE service.

Optionally, in some possible implementation manners of the present disclosure, the service control unit is specifically configured to: if determining that the LTE network signal quality of the terminal of the VoLTE service cannot satisfy the VoLTE service, send a response message of the bearer setup request message to a mobility management network element MME, where the response message makes an Internet protocol multimedia subsystem IMS trigger the terminal to initiate the circuit switched fallback call.

Optionally, in some possible implementation manners of the present disclosure, the access network device determines, based on an LTE network uplink signal quality parameter and/or an LTE network downlink signal quality parameter of the terminal of the VoLTE service, that the LTE network signal quality of the terminal cannot satisfy the VoLTE service.

Optionally, in some possible implementation manners of the present disclosure, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

Optionally, in some possible implementation manners of the present disclosure, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

Optionally, in some possible implementation manners of the present disclosure, the access network device 700 further includes:

a sending unit, configured to: after the receiving unit 710 receives, from the core network device, the bearer setup request message of the VoLTE service, send a first measurement control instruction to the terminal; and the receiving unit 710 is further configured to receive a first measurement report sent by the terminal in response to the first measurement control instruction, where the first measurement report carries the LTE network downlink signal quality parameter of the terminal.

Optionally, in some possible implementation manners of the present disclosure, the terminal is a calling terminal or a called terminal of the VoLTE service.

Optionally, in some possible implementation manners of the present disclosure, a bearer of the VoLTE service is a bearer whose quality of service class identifier QCI=1.

Optionally, in some possible implementation manners of the present disclosure, the service control unit is further configured to: before rejecting the bearer setup request message, determine that the terminal has registered with a circuit switched domain.

Optionally, in some possible implementation manners of the present disclosure, the receiving unit is further configured to receive a notification message from the core network device, where the notification message carries indication information used to indicate that the terminal has registered with the circuit switched domain, where the service control unit determines, based on the notification message, that the terminal has registered with the circuit switched domain.

Optionally, in some possible implementation manners of the present disclosure, the service control unit is further configured to: after the bearer setup request message of the VoLTE service is received from the core network device, and before the bearer setup request message is rejected, determine that 2G/3G network signal quality of the terminal satisfies a voice service.

Optionally, in some possible implementation manners of the present disclosure, the access network device further includes a sending unit, configured to: after the bearer setup request message of the VoLTE service is received from the core network device, send a second measurement control instruction to the terminal, where the second measurement control instruction is used to instruct the terminal to measure the 2G/3G network signal quality; and the receiving unit is configured to receive a second measurement report sent by the terminal in response to the second measurement control instruction, where the second measurement report carries a 2G/3G network downlink signal quality parameter of the terminal.

It may be understood that, functions of functional modules of the access network device 700 in this embodiment may be specifically implemented according to the methods in the foregoing method embodiments. For a specific implementation process, refer to the related descriptions in the method embodiments, and details are not described herein again.

Figure 8:
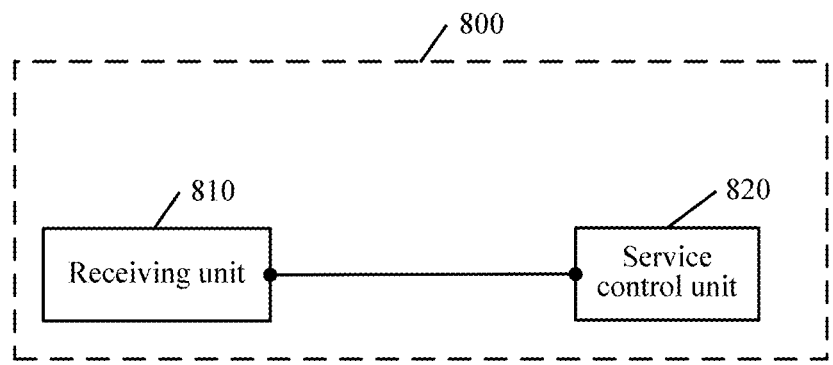
FIG. 8 is a schematic diagram of a terminal according to an illustrative embodiment of the present disclosure.

Referring to FIG. 8, an embodiment of the present disclosure further provides a terminal 800, which may include:

a receiving unit 810, configured to receive, from an Internet protocol multimedia subsystem IMS network, a call request message of a VoLTE service; and a service control unit 820, configured to reject the call request message if determining that LTE network signal quality of the terminal cannot satisfy the VoLTE service.

Optionally, in some possible implementation manners of the present disclosure, the rejecting the call request message includes: sending, by the terminal, a response message for rejecting the call request message to the IMS network, where the response message is used in the IMS network to trigger the terminal to initiate a circuit switched fallback call.

Optionally, in some possible implementation manners of the present disclosure, the terminal determines, based on an LTE network uplink signal quality parameter and/or an LTE network downlink signal quality parameter of the terminal, that LTE network signal quality of the terminal cannot satisfy the VoLTE service.

Optionally, in some possible implementation manners of the present disclosure, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

Optionally, in some possible implementation manners of the present disclosure, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

Optionally, in some possible implementation manners of the present disclosure, the call request message is an invite message.

Optionally, in some possible implementation manners of the present disclosure, the response message is a temporarily unavailable response message (for example, a 480 message).

It may be understood that, functions of functional modules of the terminal 800 (which may also be referred to as a communications terminal) in this embodiment may be specifically implemented according to the methods in the foregoing method embodiments. For a specific implementation process, refer to the related descriptions in the method embodiments, and details are not described herein again.

Figure 9:
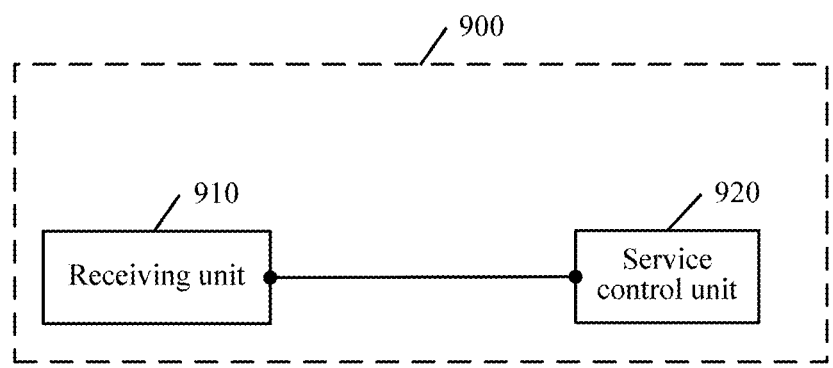
FIG. 9 is a schematic diagram of another terminal according to an illustrative embodiment of the present disclosure.

Referring to FIG. 9, an embodiment of the present disclosure further provides a terminal 900, including:

a receiving unit 910, configured to receive a user instruction that instructs to establish a VoLTE service; and a service control unit 920, configured to call a called terminal of the VoLTE service in a circuit switched domain if determining that the LTE network signal quality of the terminal cannot satisfy the VoLTE service.

Optionally, in some possible implementation manners of the present disclosure, the service control unit 920 determines, based on an LTE network uplink signal quality parameter and/or an LTE network uplink signal quality parameter of the terminal, that the LTE network signal quality of the terminal cannot satisfy the VoLTE service.

Optionally, in some possible implementation manners of the present disclosure, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

Optionally, in some possible implementation manners of the present disclosure, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

Optionally, in some possible implementation manners of the present disclosure, the terminal further includes:

a measurement unit, which may be configured to: after the user instruction that instructs to establish the VoLTE service is received, measure LTE network downlink signal quality, to obtain the LTE network downlink signal quality parameter of the terminal.

Optionally, in some possible implementation manners of the present disclosure, the service control unit 920 is further configured to: before calling the called terminal of the VoLTE service in the circuit switched domain, determine that the terminal has registered with the circuit switched domain.

Optionally, in some possible implementation manners of the present disclosure, the service control unit 920 is further configured to: before calling the called terminal of the VoLTE service in the circuit switched domain, register with the circuit switched domain when the terminal has not registered with the circuit switched domain.

Optionally, in some possible implementation manners of the present disclosure, the registering, by the service control unit 920, with the circuit switched domain includes: registering with the circuit switched domain in a combined attach manner, or camping on the circuit switched domain by means of a reselection process, and registering with the circuit switched domain.

Optionally, in some possible implementation manners of the present disclosure, the service control unit 920 is further configured to: before calling the called terminal of the VoLTE service in the circuit switched domain, determine that network signal quality of the circuit switched domain satisfies a voice service.

Optionally, in some possible implementation manners of the present disclosure, before the service control unit 920 calls the called terminal of the VoLTE service in the circuit switched domain, the receiving unit receives a notification message from the Long Term Evolution network, where the notification message carries a Long Term Evolution network uplink signal quality parameter and/or a Long Term Evolution network downlink signal quality parameter of the terminal, and the notification message is used by the terminal 900 to determine that the Long Term Evolution network signal quality of the terminal cannot satisfy the VoLTE service. For example, the notification message is from an access network device of the Long Term Evolution network.

It may be understood that, functions of functional modules of the terminal 900 (which may also be referred to as a communications terminal) in this embodiment may be specifically implemented according to the methods in the foregoing method embodiments. For a specific implementation process, refer to the related descriptions in the method embodiments, and details are not described herein again.

Figure 10:
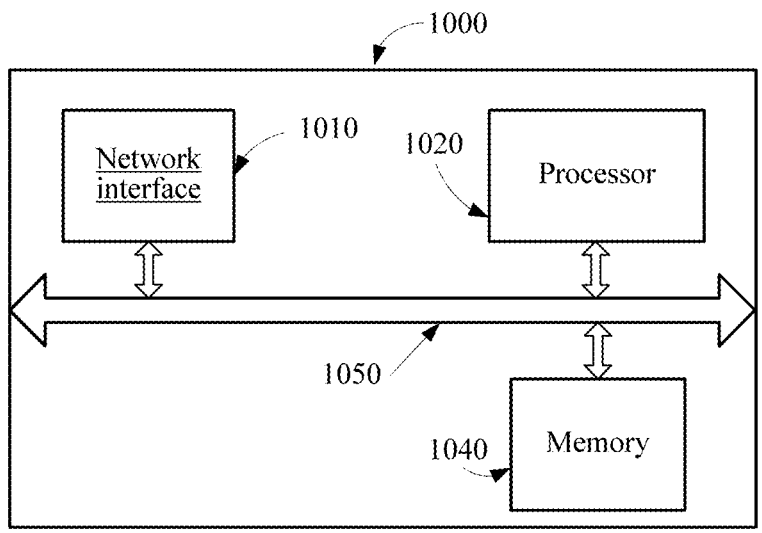
FIG. 10 is a schematic diagram of another access network device according to an illustrative embodiment of the present disclosure.

Referring to FIG. 10, an embodiment of the present disclosure further provides an access network device 1000, which may include: a network interface 1010, a processor 1020, a memory 1040, and the like.

The memory 1040 may include a read-only memory and a random access memory, and provide an instruction and data to the processor 1020. In addition, a part of the memory 1040 may further include a non-volatile random access memory.

The processor 1020 mainly controls operations of the access network device 1000, where the processor 1020 may also be referred to as a central processing unit (CPU). The memory 1040 may include a read-only memory and a random access memory, and provides an instruction and data to the processor 1020. A part of the memory 1040 may further include a non-volatile random access memory (NVRAM). In specific application, components of the access network device 1000 are coupled together by using a bus system 1050, where in addition to a data bus, the bus system 1050 may include a power bus, a control bus, a status signal bus, and the like. However, for purpose of clear description, various types of buses in the figure are all marked as the bus system 1050.

The methods disclosed in the foregoing embodiments of the present disclosure may be applied to the processor 1020, or are implemented by the processor 1020. The processor 1020 may be an integrated circuit chip and has a signal processing capability. In an implementation process, steps of the foregoing methods may be accomplished by using an integrated logic circuit of hardware in the processor 1020 or an instruction in a form of software. The foregoing processor 1020 may be a general purpose processor, a digital signal processor (DSP), an application-specific integrated circuit (ASIC), a field programmable gate array (FPGA), or another programmable logic device, discrete gate or transistor logic device, or discrete hardware component. The processor 141 may implement or execute methods, steps and logical block diagrams disclosed in the embodiments of the present disclosure. The general purpose processor may be a microprocessor or the processor may be any conventional processor and the like. Steps of the methods disclosed with reference to the embodiments of the present disclosure may be directly executed and completed by a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 1040, for example, the processor 1020 may read information in the memory 1040, and complete the steps of the foregoing method in combination with hardware thereof The network interface 1010 is configured to receive, from a core network device, a bearer setup request message of a VoLTE service.

The processor 1020 is configured to reject the bearer setup request message if determining that LTE network signal quality of a terminal of the VoLTE service cannot satisfy the VoLTE service.

Optionally, in some possible implementation manners of the present disclosure, the processor is specifically configured to: if determining that the LTE network signal quality of the terminal of the VoLTE service cannot satisfy the VoLTE service, send, by using the network interface, a response message for rejecting the bearer setup request message to the core network device, where the response message is used by the core network device to trigger the terminal to initiate a circuit switched fallback call.

Optionally, in some possible implementation manners of the present disclosure, the response message carries a cause value for a bearer setup failure of the VoLTE service.

Optionally, in some possible implementation manners of the present disclosure, the processor is specifically configured to: if determining that the LTE network signal quality of the terminal of the VoLTE service cannot satisfy the VoLTE service, send a response message of the bearer setup request message to a mobility management network element MME by using the network interface, where the response message makes an Internet protocol multimedia subsystem IMS trigger the terminal to initiate the circuit switched fallback call.

Optionally, in some possible implementation manners of the present disclosure, the processor determines, based on an LTE network uplink signal quality parameter and/or an LTE network downlink signal quality parameter of the terminal of the VoLTE service, that the LTE network signal quality of the terminal cannot satisfy the VoLTE service.

Optionally, in some possible implementation manners of the present disclosure, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

Optionally, in some possible implementation manners of the present disclosure, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

Optionally, in some possible implementation manners of the present disclosure, the processor 1020 is further configured to: after receiving, from a core network device, a bearer setup request message of VoLTE service, send a first measurement control instruction to the terminal by using the network interface; and receive, by using the network interface, a first measurement report sent by the terminal in response to the first measurement control instruction, where the first measurement report carries the LTE network downlink signal quality parameter of the terminal.

Optionally, in some possible implementation manners of the present disclosure, the terminal is a calling terminal or a called terminal of the VoLTE service.

Optionally, in some possible implementation manners of the present disclosure, a bearer of the VoLTE service is a bearer whose QCI=1.

Optionally, in some possible implementation manners of the present disclosure, the processor is further configured to:

before rejecting the bearer setup request message, determine that the terminal has registered with a circuit switched domain.

Optionally, in some possible implementation manners of the present disclosure, the network interface is further configured to receive a notification message from the core network device, where the notification message carries indication information used to indicate that the terminal has registered with the circuit switched domain, where the processor determines, based on the notification message, that the terminal has registered with the circuit switched domain.

Optionally, in some possible implementation manners of the present disclosure, the processor is further configured to: after the bearer setup request message of the VoLTE service is received from the core network device, and before the bearer setup request message is rejected, determine that 2G/3G network signal quality of the terminal satisfies a voice service.

Optionally, in some possible implementation manners of the present disclosure, the network interface is further configured to: after receiving, from the core network device, the bearer setup request message of the VoLTE service, send a second measurement control instruction to the terminal, where the second measurement control instruction is used to instruct the terminal to measure the 2G/3G network signal quality; and receive a second measurement report sent by the terminal in response to the second measurement control instruction, where the second measurement report carries a 2G/3G network downlink signal quality parameter of the terminal.

It may be understood that, functions of functional modules of the access network device 1000 in this embodiment may be specifically implemented according to the methods in the foregoing method embodiments. For a specific implementation process, refer to the related descriptions in the method embodiments, and details are not described herein again.

Figure 11:
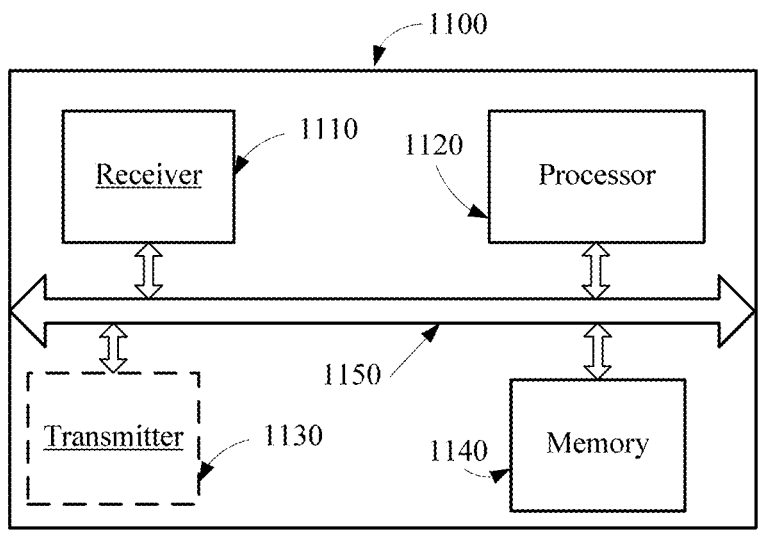
FIG. 11 is a schematic diagram of another terminal according to an illustrative embodiment of the present disclosure.

Referring to FIG. 11, an embodiment of the present disclosure further provides a terminal 1100, which may include a receiver 1110, a transmitter 1130 (optionally), a processor 1120, a memory 1140, and the like.

The memory 1140 may include a read-only memory and a random access memory, and provide an instruction and data to the processor 1120. In addition, a part of the memory 1140 may further include a non-volatile random access memory.

The processor 1120 mainly controls operations of the access network device 1100, where the processor 1120 may also be referred to as a central processing unit (CPU). The memory 1140 may include a read-only memory and a random access memory, and provides an instruction and data to the processor 1120. A part of the memory 1140 may further include a non-volatile random access memory (NVRAM). In specific application, components of the terminal 1100 are coupled together by using a bus system 1150, where in addition to a data bus, the bus system 1150 may include a power bus, a control bus, a status signal bus, and the like. However, for purpose of clear description, various types of buses in the figure are all marked as the bus system 1150.

The methods disclosed in the foregoing embodiments of the present disclosure may be applied to the processor 1120, or are implemented by the processor 1120. The processor 1120 may be an integrated circuit chip and has a signal processing capability. In an implementation process, steps of the foregoing methods may be accomplished by using an integrated logic circuit of hardware in the processor 1120 or an instruction in a form of software. The foregoing processor 1120 may be a general purpose processor, a digital signal processor (DSP), an application-specific integrated circuit (ASIC), a field programmable gate array (FPGA), or another programmable logic device, discrete gate or transistor logic device, or discrete hardware component. The processor 141 may implement or execute methods, steps and logical block diagrams disclosed in the embodiments of the present disclosure. The general purpose processor may be a microprocessor or the processor may be any conventional processor and the like. Steps of the methods disclosed with reference to the embodiments of the present disclosure may be directly executed and completed by a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 1140, for example, the processor 1120 may read information in the memory 1140, and complete the steps of the foregoing method in combination with its hardware thereof The receiver 1110 is configured to receive, from an IMS network, a call request message of a VoLTE service.

The processor 1120 is configured to reject the call request message if determining that LTE network signal quality of the terminal cannot satisfy the VoLTE service.

Optionally, in some possible implementation manners of the present disclosure, the terminal 1100 further includes a transmitter 1130, and the processor 1120 is specifically configured to send, by using the transmitter 1130, a response message for rejecting the call request message to the IMS network, where the response message is used in the IMS network to trigger the terminal to initiate a circuit switched fallback call.

Optionally, in some possible implementation manners of the present disclosure, the processor determines, based on an LTE network uplink signal quality parameter and/or an LTE network downlink signal quality parameter of the terminal, that the LTE network signal quality of the terminal cannot satisfy the VoLTE service.

Optionally, in some possible implementation manners of the present disclosure, the LTE network uplink signal quality parameter of the terminal includes: at least one of an LTE network uplink signal strength of the terminal, an LTE network uplink signal-to-noise ratio of the terminal, or an LTE network uplink packet loss rate of the terminal.

Optionally, in some possible implementation manners of the present disclosure, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

Optionally, in some possible implementation manners of the present disclosure, the call request message is an invite message.

Optionally, in some possible implementation manners of the present disclosure, the response message is a temporarily unavailable response message.

It may be understood that, functions of functional modules of the terminal 1100 (which may also be referred to as a communications terminal) in this embodiment may be specifically implemented according to the methods in the foregoing method embodiments. For a specific implementation process, refer to the related descriptions in the method embodiments, and details are not described herein again.

Figure 12:
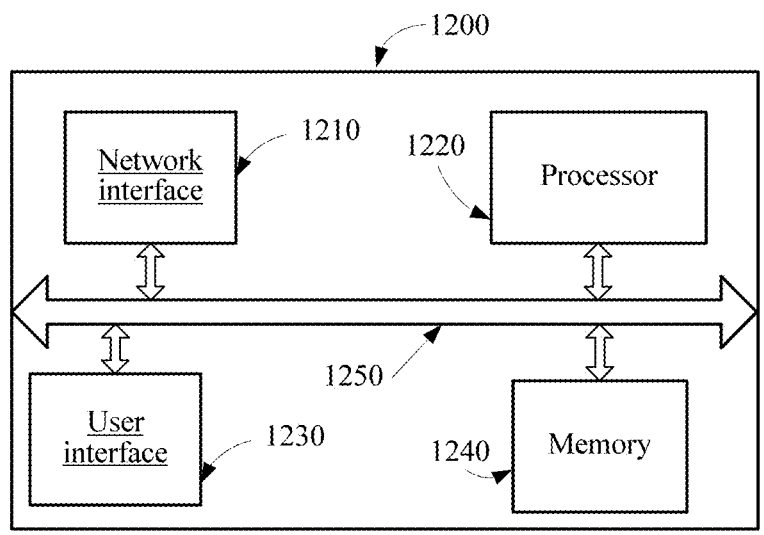
FIG. 12 is a schematic diagram of another terminal according to an illustrative embodiment of the present disclosure.

Referring to FIG. 12, an embodiment of the present disclosure further provides a terminal 1200, which may include:

a network interface 1210, a user interface 1230, a processor 1220, a memory 1240, and the like.

The user interface 1230 may be a component such as a mouse, a key, or a touchscreen.

The memory 1240 may include a read-only memory and a random access memory, and provide an instruction and data to the processor 1220. In addition, a part of the memory 1240 may further include a non-volatile random access memory.

The processor 1220 mainly controls operations of the access network device 1200, where the processor 1220 may also be referred to as a central processing unit (CPU). The memory 1240 may include a read-only memory and a random access memory, and provides an instruction and data to the processor 1220. A part of the memory 1240 may further include a non-volatile random access memory (NVRAM). Components of the terminal 1200 in a specific application are coupled by means of a bus system 1250, where the bus system 1250 includes a data bus, and also includes a power bus, a control bus, a status signal bus, and the like. However, for purpose of clear description, various types of buses in the figure are all marked as the bus system 1250.

The methods disclosed in the foregoing embodiments of the present disclosure may be applied to the processor 1220, or are implemented by the processor 1220. The processor 1220 may be an integrated circuit chip and has a signal processing capability. In an implementation process, steps of the foregoing methods may be accomplished by using an integrated logic circuit of hardware in the processor 1220 or an instruction in a form of software. The foregoing processor 1220 may be a general purpose processor, a digital signal processor (DSP), an application-specific integrated circuit (ASIC), a field programmable gate array (FPGA), or another programmable logic device, discrete gate or transistor logic device, or discrete hardware component. The processor 141 may implement or execute methods, steps and logical block diagrams disclosed in the embodiments of the present disclosure. The general purpose processor may be a microprocessor or the processor may be any conventional processor and the like. Steps of the methods disclosed with reference to the embodiments of the present disclosure may be directly executed and completed by a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 1240, for example, the processor 1220 may read information in the memory 1240, and complete the steps of the foregoing method in combination with its hardware thereof The user interface 1230 is configured to receive a user instruction that instructs to establish a VoLTE service.

The processor 1220 is configured to initiate a call to a called terminal of the VoLTE service in a circuit switched domain (by using the network interface 1210) if determining that LTE network signal quality of the terminal cannot satisfy the VoLTE service.

Specifically, for example, the processor 1220 is configured to: when determining that the LTE network signal quality of the terminal cannot satisfy the VoLTE service, first initiate a CSFB procedure to fall back to the circuit switched domain (by using the network interface 1210), and then initiate a call to the called terminal of the VoLTE service in the circuit switched domain (by using the network interface 1210).

Optionally, in some possible implementation manners of the present disclosure, the processor determines, based on an LTE network uplink signal quality parameter and/or an LTE network uplink signal quality parameter of the terminal, that the LTE network signal quality of the terminal cannot satisfy the VoLTE service.

Optionally, in some possible implementation manners of the present disclosure, the LTE network uplink signal quality parameter of the terminal includes: at least one of an LTE network uplink signal strength of the terminal, an LTE network uplink signal-to-noise ratio of the terminal, or an uplink packet loss rate of the terminal.

Optionally, in some possible implementation manners of the present disclosure, the LTE network downlink signal quality parameter of the terminal includes: at least one of an LTE network downlink signal strength of the terminal, an LTE network downlink signal-to-noise ratio of the terminal, or an LTE network downlink packet loss rate of the terminal.

Optionally, in some possible implementation manners of the present disclosure, the processor 1220 is further configured to: after receiving the user instruction that instructs to establish a VoLTE service, measure LTE network downlink signal quality, to obtain the LTE network downlink signal quality parameter of the terminal 1200.

Optionally, in some possible implementation manners of the present disclosure, the processor is further configured to: before calling the called terminal of the VoLTE service in the circuit switched domain, determine that the terminal has registered with the circuit switched domain.

Optionally, in some possible implementation manners of the present disclosure, the processor is further configured to: before calling the called terminal of the VoLTE service in the circuit switched domain, register with the circuit switched domain when the terminal has not registered with the circuit switched domain.

Optionally, in some possible implementation manners of the present disclosure, the registering, by the terminal, with the circuit switched domain includes: registering, by the terminal, with the circuit switched domain in a combined attach manner, or camping, by the terminal, on the circuit switched domain by means of a reselection process, and registering with the circuit switched domain.

Optionally, in some possible implementation manners of the present disclosure, the processor is further configured to: before calling the called terminal of the VoLTE service in the circuit switched domain, determine that network signal quality of the circuit switched domain satisfies a voice service.

Optionally, in some possible implementation manners of the present disclosure, the terminal further includes a network interface, where the network interface is configured to: before the processor calls the called terminal of the VoLTE service in the circuit switched domain, receive a notification message from the Long Term Evolution network, where the notification message carries a Long Term Evolution network uplink signal quality parameter and/or a Long Term Evolution network downlink signal quality parameter of the terminal, and the notification message is used by the processor to determine that the Long Term Evolution network signal quality of the terminal cannot satisfy the VoLTE service.

Optionally, in some possible implementation manners of the present disclosure, the notification message is from an access network device of the Long Term Evolution network.

It may be understood that, functions of functional modules of the terminal 1200 (which may also be referred to as a communications terminal) in this embodiment may be specifically implemented according to the methods in the foregoing method embodiments. For a specific implementation process, refer to the related descriptions in the method embodiments, and details are not described herein again.

Figure 13:
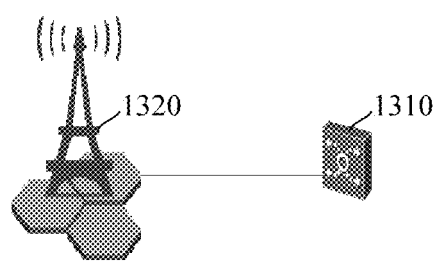
FIG. 13 is a schematic diagram of a communications system according to an embodiment of the present disclosure.

Referring to FIG. 13, an embodiment of the present disclosure further provides a communications system, including:

a core network device 1310 and an access network device 1320, where the access network device 1320 is any one of the access network devices provided in the embodiments of the present disclosure.

Figure 14:
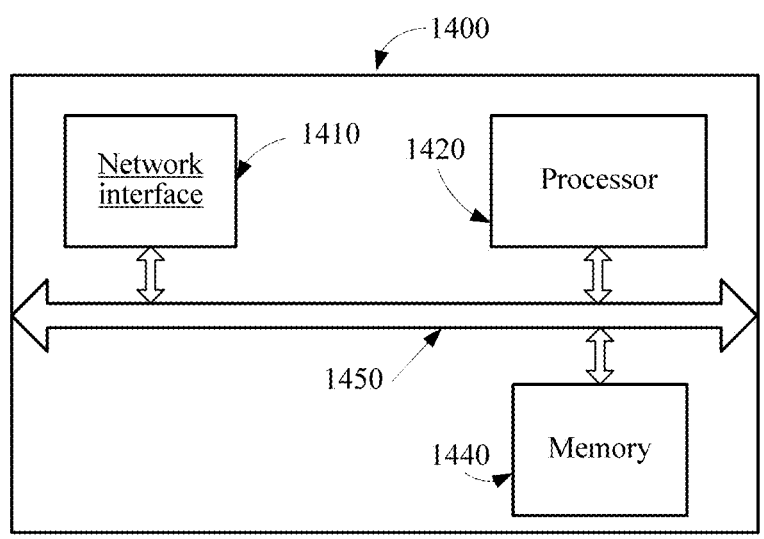
FIG. 14 is a schematic diagram of a core network device according to an embodiment of the present disclosure.

Referring to FIG. 14, an embodiment of the present disclosure provides a core network device 1400, including:

a network interface 1410, a memory 1440, and a processor 1420.

The memory 1440 may include a read-only memory and a random access memory, and provide an instruction and data to the processor 1420. In addition, a part of the memory 1440 may further include a non-volatile random access memory.

The processor 1420 mainly controls operations of the core network device 1400, where the processor 1420 may also be referred to as a central processing unit (CPU). The memory 1440 may include a read-only memory and a random access memory, and provides an instruction and data to the processor 1420. A part of the memory 1440 may further include a non-volatile random access memory (NVRAM). In specific application, components of the network device 1400 are coupled together by using a bus system 1450, where in addition to a data bus, the bus system 1450 may include a power bus, a control bus, a status signal bus, and the like. However, for purpose of clear description, various types of buses in the figure are all marked as the bus system 1450.

The processor 1420 may be configured to, for example, generate a notification message.

The network interface 1410 is configured to send a bearer setup request message of a VoLTE service to an access network device; and send a notification message to the access network device, where the notification message carries indication information used to indicate that a terminal of the VoLTE service has registered with a circuit switched domain, and the notification message is used by the access network device to: when determining that signal quality of the terminal of the VoLTE service cannot satisfy the VoLTE service, before the bearer setup request message is rejected, determine that the terminal has registered with the circuit switched domain.

The core network device may be, for example, an MME, and the access network device may be, for example, an eNB.

In the foregoing embodiments, the description of each embodiment has respective focuses. For a part that is not described in detail in an embodiment, refer to related descriptions in other embodiments.

It should be noted that, to make the description brief, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, persons skilled in the art should also appreciate that all the embodiments described in the specification are illustrative embodiments, and the related actions and modules are not necessarily mandatory to the present disclosure.

In the several embodiments provided in the present application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device, and may specifically be a processor in a computer device) to perform all or a part of the steps of the foregoing methods described in the embodiments of the present disclosure. The foregoing storage medium includes: any medium that can store program code, such as a USB flash drive, a removable hard disk, a magnetic disk, an optical disc, a read-only memory (ROM), or a random access memory (RAM).

The foregoing embodiments are merely intended for describing the technical solutions of the present disclosure, but not for limiting the present disclosure. Although the present embodiments are described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:
1. A service processing method, comprising:
receiving, by an access network device, from a core network device, a bearer setup request message of a voice over long term evolution (VoLTE) service;

determining, by the access network device, that the terminal is in a weak coverage area of the access network device;

sending, by the access network device through the core network device, a radio resource not available indication to an interne protocol multimedia subsystem (IMS);

sending, by the IMS according to the radio resource not available indication, a message which triggers the terminal to initiate a circuit switched fallback call to the terminal; and canceling, by the IMS according to the radio resource not available indication, the VoLTE service of the terminal.

2. The method according to claim 1, wherein a bearer of the VoLTE service is a bearer whose quality of service class identifier QCI is 1.

3. The method according to claim 1, wherein before sending the message which triggers the terminal to initiate the circuit switched fallback call, the method further comprises:

determining, by the access network device, that the terminal has registered with a circuit switched domain.

4. The method according to claim 3, wherein after the receiving the bearer setup request message of the VoLTE service, and before the sending the message which triggers the terminal to initiate the circuit switched fallback call, the method further comprises:

determining, by the access network device, that 2G/3G network signal quality of the terminal satisfies a voice service.

5. A system, comprising:

an access network device, configured to:
receive, from a core network device, a bearer setup request message of a voice over long term evolution (VoLTE) service;
determine that the terminal is in a weak coverage area of the access network device; and
send a radio resource not available indication to an interne protocol multimedia subsystem (IMS) through the core network device; and the IMS, configured to:
send, according to the radio resource not available indication, a message which triggers the terminal to initiate a circuit switched fallback call to the terminal, and
cancel, according to the radio resource not available indication, the VoLTE service of the terminal.

6. The system according to claim 5, wherein a bearer of the VoLTE service is a bearer whose quality of service class identifier QCI is 1.

7. The system according to claim 5, wherein the access network device is further configured to determine that the terminal has registered with a circuit switched domain.

8. The system according to claim 7, wherein the access network device is further configured to determine that 2G/3G network signal quality of the terminal satisfies a voice service.

* * * * *

UNITED STATES PATENT AND TRADEMARK OFFICE
CERTIFICATE OF CORRECTION

PATENT NO.        : 10,694,571 B2
APPLICATION NO.   : 15/441440
DATED             : June 23, 2020
INVENTOR(S)       : Xiaobo Wu and Weiwei Chong Page 1 of 1

It is certified that error appears in the above-identified patent and that said Letters Patent is hereby corrected as shown below:

In the Claims

In Column 45, Line 6, in Claim 1, delete "interne" and insert -- internet --, therefor.

In Column 46, Line 9, in Claim 5, delete "interne" and insert -- internet --, therefor.

Signed and Sealed this
Eighth Day of December, 2020

Andrei Iancu
*Director of the United States Patent and Trademark Office*